United States Patent
Liu et al.

(10) Patent No.: US 12,443,677 B2
(45) Date of Patent: Oct. 14, 2025

(54) RECOMMENDATION METHOD AND APPARATUS BASED ON AUTOMATIC FEATURE GROUPING

(71) Applicant: HUAWEI TECHNOLOGIES CO., LTD., Guangdong (CN)

(72) Inventors: Bin Liu, Shenzhen (CN); Ruiming Tang, Shenzhen (CN); Huifeng Guo, Shenzhen (CN); Niannan Xue, Shenzhen (CN); Guilin Li, Shenzhen (CN); Xiuqiang He, Shenzhen (CN); Zhenguo Li, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 531 days.

(21) Appl. No.: 17/964,117

(22) Filed: Oct. 12, 2022

(65) Prior Publication Data

US 2023/0031522 A1    Feb. 2, 2023

Related U.S. Application Data

(63) Continuation of application No. PCT/CN2021/070847, filed on Jan. 8, 2021.

(30) Foreign Application Priority Data

Apr. 14, 2020    (CN) ......................... 202010294506.3

(51) Int. Cl.
*G06F 18/00* (2023.01)
*G06F 18/2113* (2023.01)
(Continued)

(52) U.S. Cl.
CPC ...... *G06F 18/2113* (2023.01); *G06F 18/2148* (2023.01); *G06N 3/04* (2013.01); *G06N 3/08* (2013.01)

(58) Field of Classification Search
None
See application file for complete search history.

(56) References Cited

U.S. PATENT DOCUMENTS 10,956,855 B1 *   3/2021   Coughran .............. G06N 20/20
11,328,796 B1 *   5/2022   Jain ........................ G16H 10/20
(Continued)

FOREIGN PATENT DOCUMENTS

CN    109902222 A    6/2019
CN    110019163 A    7/2019
(Continued)

OTHER PUBLICATIONS

Extended European Search Report issued in EP21789516.8, dated May 23, 2023, 12 pages.
(Continued)

*Primary Examiner* — Hasanul Mobin

(57) ABSTRACT

This application relates to the field of artificial intelligence. A recommendation method based on automatic feature grouping includes: obtaining a plurality of candidate recommended objects and a plurality of association features of each of the plurality of candidate recommended objects; performing multi-order automatic feature grouping on the plurality of association features of each candidate recommended object, to obtain a multi-order feature interaction set of each candidate recommended object; obtaining an interaction feature contribution value of each candidate recommended object through calculation based on the plurality of association features in the multi-order feature interaction set of each candidate recommended object; obtaining a prediction score of each candidate recommended object through calculation based on the interaction feature contribution value of each candidate recommended object; and determining one or more corresponding candidate recommended (Continued)

objects with a high prediction score as a target recommended object.

15 Claims, 8 Drawing Sheets

(51) Int. Cl.
*G06F 18/214* (2023.01)
*G06N 3/00* (2023.01)
*G06N 3/04* (2023.01)
*G06N 3/08* (2023.01)

(56) References Cited

U.S. PATENT DOCUMENTS

| | | |
|---|---|---|
| 2003/0037041 A1 | 2/2003 | Hertz |
| 2007/0156677 A1 | 7/2007 | Szabo |
| 2017/0178134 A1* | 6/2017 | Senci ................ G06Q 20/4016 |
| 2018/0189859 A1 | 7/2018 | Campos et al. |
| 2019/0065856 A1* | 2/2019 | Harris ................ G06F 18/2148 |
| 2019/0362220 A1* | 11/2019 | Yap ........................ G06N 3/045 |
| 2020/0342358 A1* | 10/2020 | Flanagan ................ G06Q 30/02 |
| 2020/0364250 A1* | 11/2020 | Kube .................. G06F 16/3322 |
| 2021/0097384 A1* | 4/2021 | Jain ..................... G06F 16/9535 |
| 2022/0165435 A1* | 5/2022 | Paik ........................ G16H 20/10 |
| 2023/0031522 A1* | 2/2023 | Liu .......................... G06F 17/11 |

FOREIGN PATENT DOCUMENTS

| | | | | |
|---|---|---|---|---|
| CN | 110457589 A | * | 11/2019 | ......... G06F 16/9535 |
| CN | 110765363 A | | 2/2020 | |
| CN | 108959603 B | * | 3/2022 | ............. G06N 3/02 |
| WO | 2019120578 A1 | | 6/2019 | |
| WO | 2019242331 A1 | | 12/2019 | |

OTHER PUBLICATIONS

Jianxun Lian, xDeepFM: Combining Explicit and Implicit Feature Interactions for Recommender Systems, Mar. 2018, 9 pages.

* cited by examiner

RECOMMENDATION METHOD AND APPARATUS BASED ON AUTOMATIC FEATURE GROUPING

CROSS-REFERENCE TO RELATED APPLICATIONS

This application is a continuation of International Application No. PCT/CN2021/070847, filed on Jan. 8, 2021, which claims priority to Chinese Patent Application No. 202010294506.3, filed on Apr. 14, 2020. The disclosures of the aforementioned applications are hereby incorporated by reference in their entireties.

TECHNICAL FIELD

This application relates to the field of artificial intelligence, and in particular, to a recommendation method and apparatus based on automatic feature grouping.

BACKGROUND

A personalized recommendation system analyzes users and information about user behavior, to accurately predict user behavior. A good recommendation system is vital to user experience and enterprise benefits. Therefore, user behavior prediction is of great significance.

In all user behavior prediction scenarios, predicting an advertisement click-through rate is an important scenario of user behavior prediction. In a scenario of predicting an advertisement click-through rate, the recommendation system analyzes advertisement click history of a user, predicts a possibility that the user clicks each candidate advertisement provided by an advertiser, and displays an advertisement with a highest click possibility to the user, to improve an advertisement click-through rate. Historical advertisement click data usually includes a large quantity of information. The information is classified into different categories, for example, age, gender, city, week, time, and IP address of a user. The specific information is referred to as features, and categories of the features are referred to as feature categories. There is a complex interaction relationship between different features. How to identify a relationship between features becomes a major challenge to improving prediction accuracy of the personalized recommendation system.

There may be three methods for processing interaction between discrete features in an existing model:
- Method 1: Completely ignore feature interaction, and do not perform modeling on feature interaction in a model.
- Method 2: Perform implicit modeling on feature interaction by using a model such as a neural network.
- Method 3: Perform explicit modeling on feature interaction by using a model structure. Method 3 is classified into the following two types based on a quantity of features related to each interaction.
- Method 3.1: In an explicit two-order interaction model, enumerate all interaction in pairs, where each interaction includes only two features.
- Method 3.2: In an explicit higher-order interaction model, enumerate all higher-order interaction, where each interaction includes more than two features.

In Method 1, interaction between features is completely ignored. In Method 2, interaction between features cannot be explained through implicit modeling by using a neural network. Although explicit modeling is performed on feature interaction of different orders in Method 3, all feature interaction of a current order is simply enumerated in Methods 3.1 and Method 3.2. There are two problems: First, not all feature interaction is useful. Redundant feature interaction needs to be automatically identified by a model, which may have side effect on model optimization and compromise model effect. Second, because there is a plurality of higher-order interaction, direct enumeration causes huge training time overheads and storage overheads.

SUMMARY

Embodiments of this application provide a recommendation method and apparatus based on automatic feature grouping. In the solution in embodiments of this application, automatic feature grouping and feature interaction are performed on association features of a candidate recommended object, to automatically search for important higher-order interaction information. This can improve recommendation accuracy.

According to a first aspect, an embodiment of this application provides a recommendation method based on automatic feature grouping, including:

obtaining a plurality of candidate recommended objects and a plurality of association features of each of the plurality of candidate recommended objects; performing multi-order automatic feature grouping on the plurality of association features of each of the plurality of candidate recommended objects, to obtain a multi-order feature interaction set of each candidate recommended object, where each-order feature interaction set in the multi-order feature interaction set of each of the plurality of candidate recommended objects includes one or more feature interaction groups, each of the one or more feature interaction groups includes at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0; obtaining an interaction feature contribution value of each candidate recommended object through calculation based on the plurality of association features in the multi-order feature interaction set of each of the plurality of candidate recommended objects; obtaining a prediction score of each candidate recommended object through calculation based on the interaction feature contribution value of each of the plurality of candidate recommended objects; and determining one or more corresponding candidate recommended objects with a high prediction score in the plurality of candidate recommended objects as a target recommended object.

The candidate recommended object may be an object previously clicked by a user, or an object related to an object previously clicked by a user, for example, an application clicked and viewed by the user or an application previously downloaded by the user in an application store, or news information clicked and viewed by the user.

Optionally, the non-linear mathematical operation may be a vector inner product operation, matrix multiplication, or a non-linear mathematical operation in another form.

Automatic feature grouping is performed on the plurality of association features of the candidate recommended object, to automatically search for important higher-order interaction information, and the interaction information is used for recommendation. This can improve recommendation accuracy.

In a possible embodiment, the obtaining an interaction feature contribution value of each candidate recommended object through calculation based on the plurality of association features in the multi-order feature interaction set of each of the plurality of candidate recommended objects includes:
for the multi-order feature interaction set of each of the plurality of candidate recommended objects,
obtaining a $k^{th}$-order interaction result of each feature interaction group through calculation based on a plurality of association features of each feature interaction group in the $k^{th}$-order feature interaction set; and obtaining the interaction feature contribution value of the candidate recommended object through calculation based on a corresponding-order interaction result of a feature interaction group in the multi-order feature interaction set of the candidate recommended object.

In a possible embodiment, the obtaining a $k^{th}$-order interaction result of the feature interaction group through calculation based on a plurality of association features of each feature interaction group in the $k^{th}$-order feature interaction set includes:
inputting the plurality of association features of each feature interaction group in the $k^{th}$-order feature interaction set to a feature interaction model for calculation, to obtain the $k^{th}$-order interaction result of the feature interaction group.

In a possible embodiment, the inputting the plurality of association features of each feature interaction group in the $k^{th}$-order feature interaction set to a feature interaction model for calculation, to obtain the $k^{th}$-order interaction result of the feature interaction group includes:
performing the following steps on each feature interaction group in the $k^{th}$-order feature interaction set:
obtaining a feature vector of each association feature of the feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

Optionally, an interaction result of a $j^{th}$ feature interaction group in the $k^{th}$-order feature interaction set may be represented as:

$$I_j^k = \begin{cases} (g_j^k)^k - \sum_{f_i \in s_j^k} (w_{i,j}^k e_i)^k \in R, k \geq 2 \\ g_j^k \in R^m, k = 1 \end{cases}$$

$g_j^k = \Sigma_{f_i \in s_j^k} w_{i,j}^k e_i$, $g_j^k$ is a feature value of $s_j^k$, $s_j^k$ is the $j^{th}$ feature interaction group in the $k^{th}$-order feature interaction set, $f_i$ is an $i^{th}$ association feature in a plurality of association features of a candidate recommended object A, $e_i$ is a feature vector, corresponding to $f_i$, whose dimension is m, $w_{i,j}^k$ is a weight of $e_i$ of the $j^{th}$ feature interaction group in the $k^{th}$-order feature interaction set, and $R^m$ is a feature vector set, corresponding to the feature vector, whose dimension is m.

A $k^{th}$ power operation $(v)^k$ on a feature vector v is defined as first performing a $k^{th}$ power operation on each number of the feature vector, to obtain a $k^{th}$ power result of each number; and then adding $k^{th}$ power results of all numbers, to obtain a real number.

By using the foregoing designed interaction function $I_j^k$, any specified feature interaction group is enabled to generate specified-order feature interaction. The interaction function is implemented in an efficient and simple way, and can be promoted in different recommendation tasks.

In a possible embodiment, the obtaining the interaction feature contribution value of the candidate recommended object through calculation based on a corresponding-order interaction result of a feature interaction group in the multi-order feature interaction set of the candidate recommended object includes:
obtaining an interaction feature vector based on the corresponding-order interaction result of the feature interaction group in the multi-order feature interaction set of the candidate recommended object; and inputting the interaction feature vector of the candidate recommended object to a neural network model for calculation, to obtain the interaction feature contribution value of the candidate recommended object, where the neural network model is obtained based on a fully connected neural network.

The interaction feature vector is further processed by using the neural network model, to extract potential feature interaction information that is difficult to detect in the association features. This can further improve recommendation accuracy.

In a possible embodiment, the performing multi-order automatic feature grouping on the plurality of association features of each of the plurality of candidate recommended objects, to obtain a multi-order feature interaction set of each candidate recommended object includes:
inputting the plurality of association features of each of the plurality of candidate recommended objects to an automatic feature grouping model for processing, to obtain the multi-order feature interaction set of each candidate recommended object.

Further, the inputting the plurality of association features of each of the plurality of candidate recommended objects to an automatic feature grouping model for processing, to obtain the multi-order feature interaction set of each candidate recommended object includes:
for $k^{th}$-order feature interaction set of each candidate recommended object, obtaining an allocation probability of each of the plurality of association features of each candidate recommended object, where the allocation probability of each of the plurality of association features of the candidate recommended object is a probability that the association feature is allocated to the $j^{th}$ feature interaction group in the $k^{th}$-order feature interaction set, and the $j^{th}$ feature interaction group is any feature interaction group in the $k^{th}$-order feature interaction set; and obtaining the $k^{th}$-order feature interaction set of each candidate recommended object based on the allocation probability of each of the plurality of association features of the candidate recommended object.

The association feature is allocated to the $j^{th}$ feature interaction group in the $k^{th}$-order feature interaction set in uniform distribution, normal distribution, mean square distribution, or the like. Therefore, the allocation probability of the association feature may be obtained based on a uniform distribution probability function, a normal distribution probability function, or a mean square distribution probability function.

It should be noted that a grouping operation performed on the association feature based on the allocation probability of the association feature is a discrete process. Therefore, to make the grouping operation continuous, the allocation probability of the association feature is processed, to obtain a processed probability, namely, an allocation value; and then the association feature is grouped based on the allocation value.

Specifically, the obtaining the $k^{th}$-order feature interaction set of the candidate recommended object based on the allocation probability of each of the plurality of association features of the candidate recommended object includes:

determining an allocation value of the association feature based on the allocation probability of each of the plurality of association features of the candidate recommended object, where the allocation value is a probability that each association feature is allocated to the $j^{th}$ feature interaction group in the $k^{th}$-order feature interaction set; and if the allocation value of the association feature is greater than a preset threshold, allocating the association feature to the $j^{th}$ feature interaction group in the $k^{th}$-order feature interaction set, or if the allocation value of the association feature is not greater than a preset threshold, skipping allocating the association feature to the $j^{th}$ feature interaction group in the $k^{th}$-order feature interaction set.

Optionally, a manner of processing the allocation probability of the association feature may be a Gumbel-Softmax operation or another operation. The allocation value may be represented as:

$$(\Pi_{i,j}^k)_o = \frac{\exp\left(\frac{\log \alpha_o + G_o}{\tau}\right)}{\sum_{o \in \{0,1\}} \exp\left(\frac{\log \alpha_o + G_o}{\tau}\right)}$$

$\alpha_0 = p_{i,j}^k$, and $\alpha_1 = 1 - p_{i,j}^k$. $\alpha_0$ indicates a probability that the $i^{th}$ association feature in the plurality of association features of the candidate recommended object A is not allocated to the $j^{th}$ feature interaction group in the $k^{th}$-order feature interaction set, $\alpha_0$ indicates a probability that the $i^{th}$ association feature in the plurality of association features of the candidate recommended object A is allocated to the $j^{th}$ feature interaction group in the $k^{th}$-order feature interaction set, and $G_o$ is a random number that complies with Gumbel distribution. Whether the $i^{th}$ association feature is allocated to the $j^{th}$ feature interaction group in the $k^{th}$-order feature interaction set is determined based on a value relationship between $(\Pi_{i,j}^k)_0$ and $(\Pi_{i,j}^k)_1$. In $(\Pi_{i,j}^k)_0$ and $(\Pi_{i,j}^k)_1$, a sum of $(\Pi_{i,j}^k)_0$ and $(\Pi_{i,j}^k)_1$ is 1. If $(\Pi_{i,j}^k)_0$ is larger, the $i^{th}$ association feature in the plurality of association features is not allocated to the $j^{th}$ feature interaction group in the $k^{th}$-order feature interaction set. If $(\Pi_{i,j}^k)_1$ is larger, the $i^{th}$ association feature is allocated to the $j^{th}$ feature interaction group in the $k^{th}$-order feature interaction set.

$(\Pi_{i,j}^k)_1$ is the allocation value. Optionally, when $(\Pi_{i,j}^k)_1$ is greater than the preset threshold, the $i^{th}$ association feature is allocated to the $j^{th}$ feature interaction group in the $k^{th}$-order feature interaction set. When $(\Pi_{i,j}^k)_1$ is not greater than the preset threshold, the $i^{th}$ association feature is not allocated to the $j^{th}$ feature interaction group in the $k^{th}$-order feature interaction set.

The preset threshold may be 0.5, 0.6, 0.7, or another value, and 0.5 is a priority.

$G_o = -\log-\log u$, where u may comply with uniform distribution, mean square distribution, or normal distribution.

Automatic feature grouping is performed on the association features, to automatically search for important higher-order interaction information, and the higher-order interaction information is used for recommendation. This can improve accuracy of a recommended object.

According to a second aspect, an embodiment of this application provides a training method based on a prediction model, including:

obtaining training sample data, where the training sample data includes a plurality of candidate recommended object samples and a recommended object sample clicked by a user; obtaining a plurality of association features of each of the plurality of candidate recommended object samples; inputting the plurality of association features of each of the plurality of candidate recommended object samples to a multi-order automatic feature grouping model for automatic feature grouping, to obtain a multi-order feature interaction set of each candidate recommended object sample, where each-order feature interaction set in the multi-order feature interaction set of each of the plurality of candidate recommended object samples includes one or more feature interaction groups, each of the one or more feature interaction groups includes at least one of the plurality of association features of the candidate recommended object sample, in each feature interaction group in a $k^{th}$-order feature interaction set in the multi-order feature interaction set, a quantity of association features used in a non-linear mathematical operation is k, and k is an integer greater than 0; inputting the multi-order feature interaction set of each of the plurality of candidate recommended object samples to a feature interaction model for calculation, to obtain an interaction feature contribution value of each candidate recommended object sample; obtaining a prediction score of each candidate recommended object sample through calculation based on the interaction feature contribution value of each of the plurality of candidate recommended object samples; and adjusting a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model.

Optionally, the non-linear mathematical operation may be a vector inner product operation, matrix multiplication, or a non-linear mathematical operation in another form.

The plurality of candidate recommended object samples may be special-purpose training data during training, or candidate recommended object samples during historical recommendation.

Important higher-order interaction information can be automatically searched for through automatic feature grouping during training. This can reduce optimization difficulty during training, and greatly improve precision of a prediction model.

In a possible embodiment, the inputting the multi-order feature interaction set of each of the plurality of candidate recommended object samples to a feature interaction model for calculation, to obtain an interaction feature contribution value of each candidate recommended object sample includes:

for the multi-order feature interaction set of each candidate recommended object sample, obtaining a $k^{th}$-order interaction result of the feature interaction group through calculation based on association features of each feature interaction group in the $k^{th}$-order feature interaction set, where the $k^{th}$-order feature interaction set is any-order feature interaction set in the multi-order feature interaction set of the candidate recommended object sample; and obtaining the interaction feature contribution value of the candidate recommended object sample through calculation based on a corresponding-order interaction result of a feature interaction group in the multi-order feature interaction set of the candidate recommended object sample.

In a possible embodiment, the obtaining a $k^{th}$-order interaction result of the feature interaction group through calculation based on association features of each feature interaction group in the $k^{th}$-order feature interaction set includes:

performing the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, the obtaining the interaction feature contribution value of the candidate recommended object sample through calculation based on a corresponding-order interaction result of a feature interaction group in the multi-order feature interaction set of the candidate recommended object sample includes:

obtaining an interaction feature vector based on the corresponding-order interaction result of the feature interaction group in the multi-order feature interaction set of each candidate recommended object sample; and inputting the interaction feature vector to a neural network model for calculation, to obtain the interaction feature contribution value of the candidate recommended object sample, where the neural network model is obtained based on a fully connected neural network.

The interaction feature vector is further processed by using the neural network model, to extract potential feature interaction information that is difficult to detect in the association features. This can further improve recommendation accuracy.

In a possible embodiment, the adjusting a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model includes:

adjusting the parameter of the automatic feature grouping model, the parameter of the feature interaction model, and a parameter of the neural network model based on the candidate recommended object sample corresponding to the maximum prediction score and the object sample clicked by the user, to obtain an adjusted automatic feature grouping model, an adjusted feature interaction model, and an adjusted neural network model.

In a possible embodiment, the inputting the plurality of association features of each of the plurality of candidate recommended object samples to an automatic feature grouping model for multi-order automatic feature grouping, to obtain a multi-order feature interaction set of each candidate recommended object sample includes:

for $k^{th}$-order feature interaction set of each candidate recommended object sample, obtaining an allocation probability of each of the plurality of association features of the candidate recommended object sample, where the allocation probability of each of the plurality of association features of the candidate recommended object sample is a probability that the association feature is allocated to a $j^{th}$ feature interaction group in the $k^{th}$-order feature interaction set, and the $j^{th}$ feature interaction group is any feature interaction group in the $k^{th}$-order feature interaction set; and obtaining the $k^{th}$-order feature interaction set of the candidate recommended object sample based on the allocation probability of each of the plurality of association features of the candidate recommended object sample.

In a possible embodiment, the obtaining the $k^{th}$ order feature interaction set of the candidate recommended object sample based on the allocation probability of each of the plurality of association features of the candidate recommended object sample includes:

determining an allocation value of the association feature based on the allocation probability of each of the plurality of association features of the candidate recommended object sample, where the allocation value is a probability that each association feature is allocated to the $j^{th}$ feature interaction group in the $k^{th}$-order feature interaction set; and if the allocation value of the association feature is greater than a preset threshold, allocating the association feature to the $j^{th}$ feature interaction group in the $k^{th}$-order feature interaction set, or if the allocation value of the association feature is not greater than a preset threshold, skipping allocating the association feature to the $j^{th}$ feature interaction group in the $k^{th}$-order feature interaction set.

According to a third aspect, an embodiment of this application provides a recommendation apparatus based on automatic feature grouping, including:

an obtaining unit, configured to obtain a plurality of candidate recommended objects and a plurality of association features of each of the plurality of candidate recommended objects;

an automatic feature grouping unit, configured to perform automatic feature grouping on the plurality of association features of each of the plurality of candidate recommended objects, to obtain a multi-order feature interaction set of each candidate recommended object, where each-order feature interaction set in the multi-order feature interaction set of each of the plurality of candidate recommended objects includes one or more feature interaction groups, each of the one or more feature interaction groups includes at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0;

a calculation unit, configured to: obtain an interaction feature contribution value of each candidate recommended object through calculation based on the plurality of association features in the multi-order feature interaction set of each of the plurality of candidate recommended objects; and obtain a prediction score of each candidate recommended object through calculation based on the interaction feature contribution value of each of the plurality of candidate recommended objects; and a determining unit, configured to determine one or more corresponding candidate recommended objects with a high prediction score in the plurality of candidate recommended objects as a target recommended object.

In a possible embodiment, when obtaining the interaction feature contribution value of each candidate recommended object through calculation based on the plurality of association features in the multi-order feature interaction set of each of the plurality of candidate recommended objects, the calculation unit is further configured to:

for the multi-order feature interaction set of each of the plurality of candidate recommended objects, obtain a $k^{th}$-order interaction result of each feature interaction group through calculation based on a plurality of association features of each feature interaction group in the $k^{th}$-order feature interaction set; and obtain the interaction feature contribution value of the candidate recommended object through calculation based on a corresponding-order interaction result of a feature interaction group in the multi-order feature interaction set of the candidate recommended object.

In a possible embodiment, when obtaining the $k^{th}$-order interaction result of the feature interaction group through calculation based on the plurality of association features of each feature interaction group in the $k^{th}$-order feature interaction set, the calculation unit is further configured to:

input the plurality of association features of each feature interaction group in the $k^{th}$-order feature interaction set to a feature interaction model for calculation, to obtain the $k^{th}$-order interaction result of each feature interaction group.

In a possible embodiment, when inputting the plurality of association features of each feature interaction group in the $k^{th}$-order feature interaction set to the feature interaction model for calculation, to obtain the $k^{th}$-order interaction result of each feature interaction group, the calculation unit is configured to:

perform the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of each candidate recommended object through calculation based on the corresponding-order interaction result of the feature interaction group in the multi-order feature interaction set of each candidate recommended object, the calculation unit is configured to:

obtain an interaction feature vector based on the corresponding-order interaction result of the feature interaction group in the multi-order feature interaction set of each candidate recommended object; and input the interaction feature vector to a neural network model for calculation, to obtain the interaction feature contribution value of the candidate recommended object, where the neural network model is obtained based on a fully connected neural network.

In a possible embodiment, the automatic feature grouping unit is further configured to: input the plurality of association features of each of the plurality of candidate recommended objects to an automatic feature grouping model for processing, to obtain the multi-order feature interaction set of each candidate recommended object.

Specifically, the automatic feature grouping unit is further configured to:

for $k^{th}$-order feature interaction set of each candidate recommended object, obtain an allocation probability of each of the plurality of association features of each candidate recommended object, where the allocation probability of each of the plurality of association features of the candidate recommended object is a probability that each association feature is allocated to a $j^{th}$ feature interaction group in the $k^{th}$-order feature interaction set, and the $j^{th}$ feature interaction group is any feature interaction group in the $k^{th}$-order feature interaction set; and obtain the $k^{th}$-order feature interaction set of each candidate recommended object based on the allocation probability of each of the plurality of association features of each candidate recommended object.

Further, when obtaining the $k^{th}$-order feature interaction set of the candidate recommended object based on the allocation probability of each of the plurality of association features of the candidate recommended object, the automatic feature grouping unit is further configured to:

determine an allocation value of the association feature based on the allocation probability of each of the plurality of association features of the candidate recommended object, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

Optionally, the non-linear mathematical operation may be a vector inner product operation, matrix multiplication, or another non-linear mathematical operation.

According to a fourth aspect, an embodiment of this application provides a training device based on a prediction model, including:

an obtaining unit, configured to obtain training sample data, where the training sample data includes a plurality of candidate recommended object samples and a recommended object sample clicked by a user; and obtain a plurality of association features of each of the plurality of candidate recommended object samples;

an automatic feature grouping unit, configured to input the plurality of association features of each of the plurality of candidate recommended object samples to a multi-order automatic feature grouping model for automatic feature grouping, to obtain a multi-order feature interaction set of each candidate recommended object sample, where each-order feature interaction set in the multi-order feature interaction set of each of the plurality of candidate recommended object samples includes one or more feature interaction groups, each of the one or more feature interaction groups includes at least one of the plurality of association features of the candidate recommended object sample, in each feature interaction group in a $k^{th}$-order feature interaction set in the multi-order feature interaction set, a quantity of association features used in a non-linear mathematical operation is k, and k is an integer greater than 0;

a calculation unit, configured to: input the multi-order feature interaction set of each of the plurality of candidate recommended object samples to a feature interaction model for calculation, to obtain an interaction feature contribution value of each candidate recommended object sample; and obtain a prediction score of each candidate recommended object sample through calculation based on the interaction feature contribution value of each of the plurality of candidate recommended object samples; and an adjustment unit, configured to adjust a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model.

Optionally, the non-linear mathematical operation may be a vector inner product operation, matrix multiplication, or another non-linear mathematical operation.

In a possible embodiment, when inputting the multi-order feature interaction set of each of the plurality of candidate recommended object samples to the feature interaction model for calculation, to obtain the interaction feature contribution value of each candidate recommended object sample, the calculation unit is further configured to:

for the multi-order feature interaction set of each candidate recommended object sample, obtain a $k^{th}$-order interaction result of the feature interaction group through calculation based on association features of each feature interaction group in the $k^{th}$-order feature interaction set, where the $k^{th}$-order feature interaction set is any-order feature interaction set in the multi-order feature interaction set of the candidate recommended object sample; and obtain the interaction feature contribution value of the candidate recommended object sample B through calculation based on a corresponding-order interaction result of a feature interaction group in the multi-order feature interaction set of the candidate recommended object sample.

In a possible embodiment, when obtaining the $k^{th}$-order interaction result of the feature interaction group through calculation based on the association features of each feature interaction group in the $k^{th}$-order feature interaction set, the calculation unit is further configured to:

perform the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of the candidate recommended object sample through calculation based on the corresponding-order interaction result of the feature interaction group in the multi-order feature interaction set of the candidate recommended object sample, the calculation unit is further configured to:

obtain an interaction feature vector based on the corresponding-order interaction result of the feature interaction group in the multi-order feature interaction set of each candidate recommended object sample; and input the interaction feature vector to a neural network model for calculation, to obtain the interaction feature contribution value of the candidate recommended object sample, where the neural network model is obtained based on a fully connected neural network.

In a possible embodiment, the adjustment unit is further configured to:

adjust the parameter of the automatic feature grouping model, the parameter of the feature interaction model, and a parameter of the neural network model based on the candidate recommended object sample corresponding to the maximum prediction score and the object sample clicked by the user, to obtain an adjusted automatic feature grouping model, an adjusted feature interaction model, and an adjusted neural network model.

Optionally, the automatic feature grouping unit is further configured to:

for $k^{th}$-order feature interaction set of each candidate recommended object sample, obtain an allocation probability of each of the plurality of association features of the candidate recommended object sample, where the allocation probability of each of the plurality of association features of the candidate recommended object sample is a probability that the association feature is allocated to a $j^{th}$ feature interaction group in the $k^{th}$-order feature interaction set, and the $j^{th}$ feature interaction group is any feature interaction group in the $k^{th}$-order feature interaction set; and obtain the $k^{th}$-order feature interaction set of the candidate recommended object sample based on the allocation probability of each of the plurality of association features of the candidate recommended object sample.

In a possible embodiment, when obtaining the $k^{th}$-order feature interaction set of the candidate recommended object sample based on the allocation probability of each of the plurality of association features of the candidate recommended object sample, the automatic feature grouping unit is further configured to:

determine an allocation value of the association feature based on the allocation probability of each of the plurality of association features of the candidate recommended object sample, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

According to a fifth aspect, an embodiment of this application provides another recommendation apparatus based on automatic feature grouping, including:

a memory, configured to store instructions; and at least one processor, coupled to the memory.

When the at least one processor executes the instructions, the instructions enable the processor to perform some or all methods in the first aspect.

According to a sixth aspect, an embodiment of this application provides another training device based on a prediction model, including:

a memory, configured to store instructions; and at least one processor, coupled to the memory.

When the at least one processor executes the instructions, the instructions enable the processor to perform some or all methods in the second aspect.

According to a seventh aspect, an embodiment of this application provides a chip system. The chip system is applied to an electronic device, and the chip system includes one or more interface circuits and one or more processors. The interface circuit and the processor are interconnected by using a line, the interface circuit is configured to receive a signal from a memory of the electronic device, and send the signal to the processor, and the signal includes computer instructions stored in the memory. When the processor executes the computer instructions, the electronic device performs some or all methods in the first aspect or the second aspect.

According to an eighth aspect, an embodiment of this application provides a computer storage medium. The computer storage medium stores a computer program, the computer program includes program instructions, and when the program instructions are executed by a processor, the processor performs some or all methods in the first aspect or the second aspect.

According to a ninth aspect, an embodiment of this application provides a computer program product including computer instructions. When the computer instructions are run on a recommendation apparatus, the recommendation apparatus is enabled to perform some or all methods in the first aspect or the second aspect.

These or other aspects of this application are more concise and easier to understand in descriptions of the following embodiments.

DESCRIPTION OF DRAWINGS

To describe technical solutions in embodiments of this application or in the conventional technology more clearly, the following briefly describes the accompanying drawings for describing embodiments or the conventional technology. It is clear that the accompanying drawings in the following descriptions show some embodiments of this application, and a person of ordinary skill in the art may still derive other drawings from these accompanying drawings without creative efforts.

DESCRIPTION OF EMBODIMENTS

First, it should be noted that in this application, "perform a first operation on each of a plurality of objects (for example, M objects)" is the same as "perform a first operation on a $j^{th}$ object in a plurality of objects, where j=1, 2, . . . , or M".

The following describes embodiments of this application with reference to the accompanying drawings.

Figure 1A:
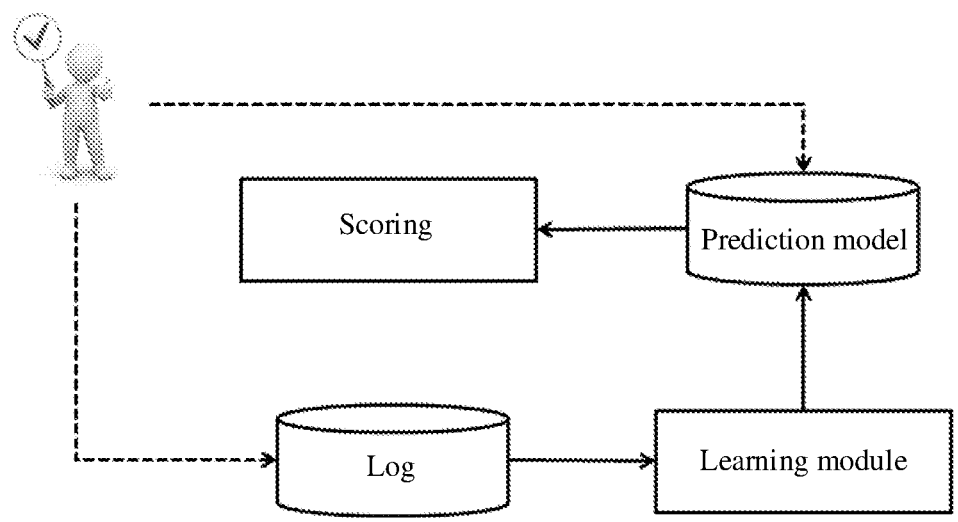
FIG. 1a is a schematic diagram of an architecture of a recommendation system according to an embodiment of this application.

FIG. 1a is a schematic diagram of an architecture of a recommendation system according to an embodiment of this application. As shown in FIG. 1a, the recommendation system includes a prediction model, a learning module, and a log database.

Each time a user triggers a request, the recommendation system inputs the request and corresponding information to the prediction model. The prediction model predicts one or more behaviors of the user based on each input feature, and provides a prediction score for each behavior. The recommendation system finds a most possible behavior of the user based on the prediction score, and recommends to the user. In addition, an actual behavior (for example, clicking a recommended object or not clicking a recommended object) of the user is stored in the log database as training data. The learning module continuously updates a parameter of the prediction model, to improve prediction effect of the model. This application corresponds to a prediction model part of the recommendation system.

For example, when the user opens an application store of a mobile phone, the application store is triggered to provide a recommended application. The application store predicts, based on information such as a historical download record of the user, a feature of an application, time, a location, and another environment feature, a possibility that the user downloads each specific candidate application. An application that is most likely to be downloaded by the user may be displayed based on a result obtained through calculation, so that the user can download the application. This can improve an application download rate. Each click of the user is also stored in a log, and the learning module trains and updates the parameter of the prediction model by using the log.

Figure 1B:
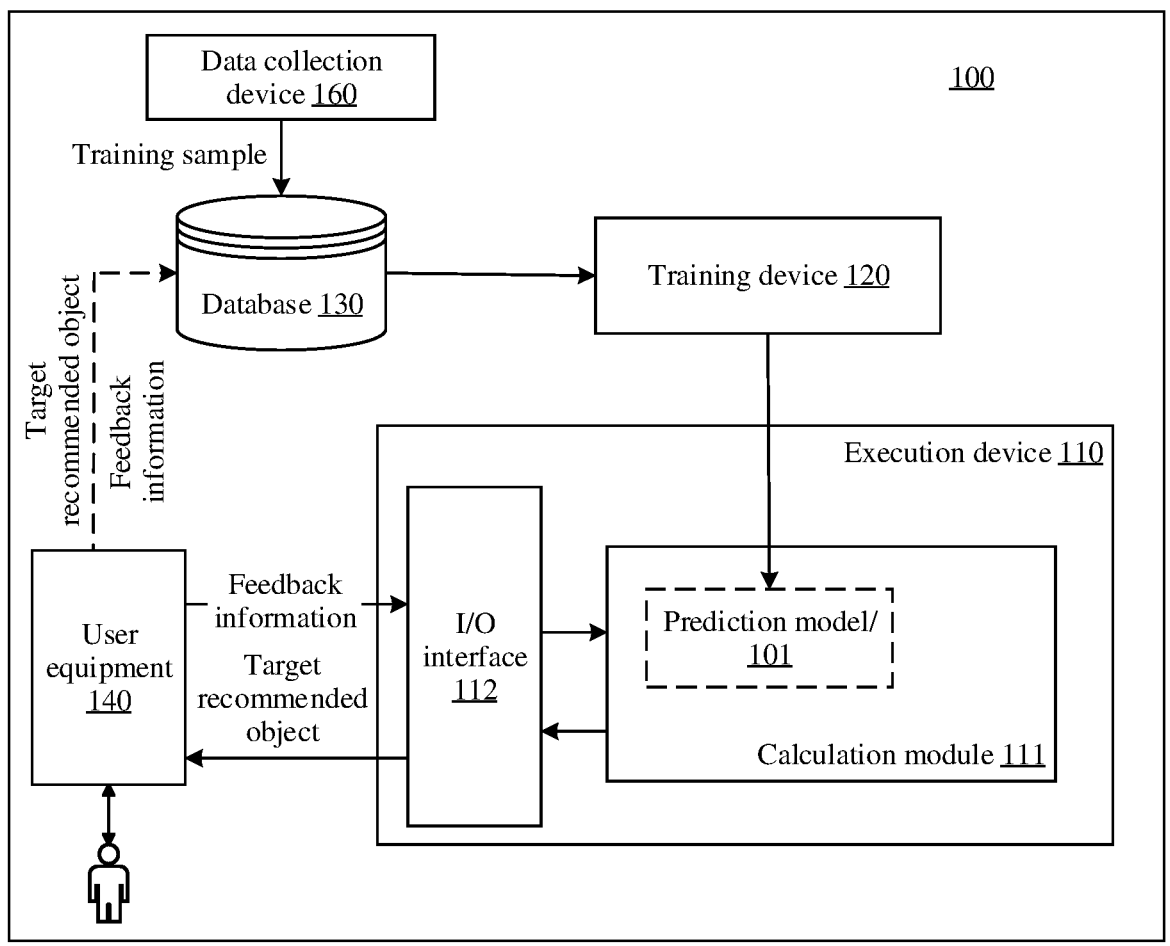
FIG. 1b is a schematic diagram of an architecture of another recommendation system according to an embodiment of this application.

Refer to FIG. 1b. An embodiment of this application provides an architecture of another recommendation system 100. A data collection device 160 is configured to collect a plurality of pieces of training sample data and a plurality of association features of the training sample data from a network, and store the training sample data and the association features in a database 130. Each piece of training sample data includes a plurality of recommended object samples and a recommended object sample clicked by a user. A training device 120 performs training based on the training sample data and the plurality of association features of the training sample data that are maintained in the database 130, to obtain a prediction model 101. A calculation module 111 obtains a prediction score of a candidate recommended object based on the prediction model 101, where a higher prediction score indicates a higher probability that the candidate recommended object is clicked by the user; and then determines, based on the prediction score, whether to recommend the candidate recommended object to the user. The following describes in more detail how the training device 120 obtains the prediction model 101 based on the training sample data and the plurality of association features of the training sample data.

The prediction model includes an automatic feature grouping model, a feature interaction model, a neural network model, and a prediction integration model. The training device 120 groups a plurality of association features of each of a plurality of candidate recommended object samples by using the automatic feature grouping model, to obtain a multi-order feature interaction set of the candidate recommended object sample. Each-order feature interaction set in the multi-order feature interaction set includes one or more feature interaction groups, and each feature interaction group includes at least one of the plurality of association features of the candidate recommended object sample. The training device 120 interacts, by using the feature interaction model a plurality of association features of the feature interaction group in the multi-order feature interaction set of each of the plurality of candidate recommended object samples, to obtain an interaction feature vector of the candidate recommended object sample. The training device 120 obtains, by using the neural network model, an interaction feature contribution value of the candidate recommended object sample through calculation based on the input interaction feature vector of each candidate recommended object sample. The training device 120 obtains, by using the prediction integration model, a prediction score of each candidate recommended object sample based on the interaction feature contribution value.

When training the prediction model, the training device 120 obtains the prediction score of the candidate recommended object sample based on the plurality of association features of each of the plurality of candidate recommended object samples; and then adjusts each parameter of the prediction model based on the prediction score and a recommended object sample clicked by the user, to obtain an adjusted prediction model. The foregoing process is repeated for a plurality of times, to obtain a final prediction model.

Because the automatic feature grouping model, the feature interaction model, the neural network model, and the prediction integration model are trained simultaneously, the foregoing training process may be considered as a joint training process.

The prediction model 101 obtained by the training device 120 may be applied to different systems or devices. In FIG. 1b, an I/O interface 112 is configured for an execution device 110, to exchange data with an external device, for example, sending a target recommended object to user equipment 140. A "user" may output feedback information of the user by using the user equipment 140 to the I/O interface 112. The feedback information is the recommended object clicked by the user.

The calculation module 111 performs recommendation by using the prediction model 101. Specifically, after obtaining a plurality of recommended objects and a plurality of association features of each of the plurality of candidate recommended objects, the calculation module 111 inputs the plurality of association features of each candidate recommended object to the prediction model for calculation, to obtain a prediction score of the candidate recommended object; and then determines one or more corresponding candidate recommended objects with a high prediction score as a target recommended object.

Finally, if the execution device 110 determines to recommend the target recommended object to the user, the execution device 110 returns the target recommended object to the user equipment 140 through the I/O interface 112, to provide the target recommended object to the user.

More deeply, the training device 120 may generate, for different targets, corresponding prediction models 101 based on different data, to provide a better result for the user.

In the case shown in FIG. 1b, the user may view, on the user equipment 140, the target recommended object output by the execution device 110. A specific presentation form may be a specific manner such as display, a sound, or an action. The user equipment 140 may also serve as a data collection end to store the collected training sample data in the database 130.

It should be noted that FIG. 1b is only a schematic diagram of the architecture of the system according to this embodiment. A location relationship between a device, a component, a module, and the like shown in the figure constitutes no limitation.

The training device 120 obtains, from the database 130, recommendation information of one or more rounds that is obtained through sampling, where the recommendation information includes a target recommended object and feedback information of the user; and trains the prediction model 101 based on the recommendation information of the one or more rounds.

In a possible embodiment, training of the prediction model 101 is performed offline, that is, the training device 120 and the database are independent of the user equipment 140 and the execution device 110. For example, the training device 120 is a third-party server. Before the execution device 110 works, the prediction model 101 is obtained from the third-party server.

In a possible embodiment, the training device 120 is integrated with the execution device 110, and the execution device 110 is disposed in the user equipment 140.

Figure 1C:
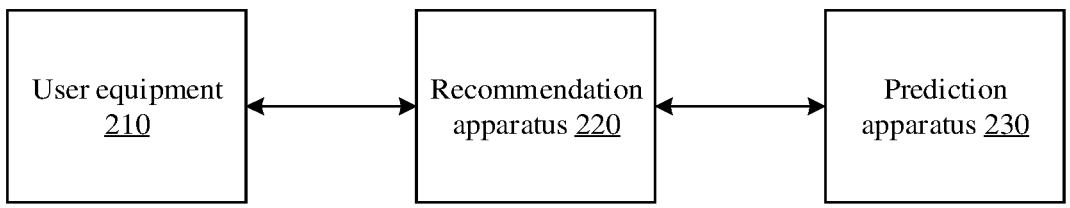
FIG. 1c is a schematic diagram of an architecture of another recommendation system according to an embodiment of this application.

FIG. 1c is a schematic diagram of an architecture of another recommendation system according to an embodiment of this application. As shown in FIG. 1c, the architecture of the recommendation system includes user equipment 210, a recommendation apparatus 220, and a prediction apparatus 230.

After a user triggers a recommendation instruction, for example, the user opens an application store of the user equipment 210, the user equipment 210 sends a recommendation request to the recommendation apparatus 220. After receiving the recommendation request, the recommendation apparatus 220 sends candidate recommended objects, for example, various applications, to the prediction apparatus 230. The prediction apparatus 230 obtains a prediction score of each application by using a prediction model 101, and sends the prediction score of each application to the recommendation apparatus 220. The recommendation apparatus 220 sends a recommended application to the user equipment 210 based on the prediction score of each application.

The user equipment 210 records an application clicked by the user, and feeds back the application to the prediction apparatus 230 by using the recommendation apparatus 220, or directly feeds back the application to the prediction apparatus 230. The prediction apparatus 230 trains the prediction model based on the application clicked by the user and a prediction score of the application.

Figure 2:
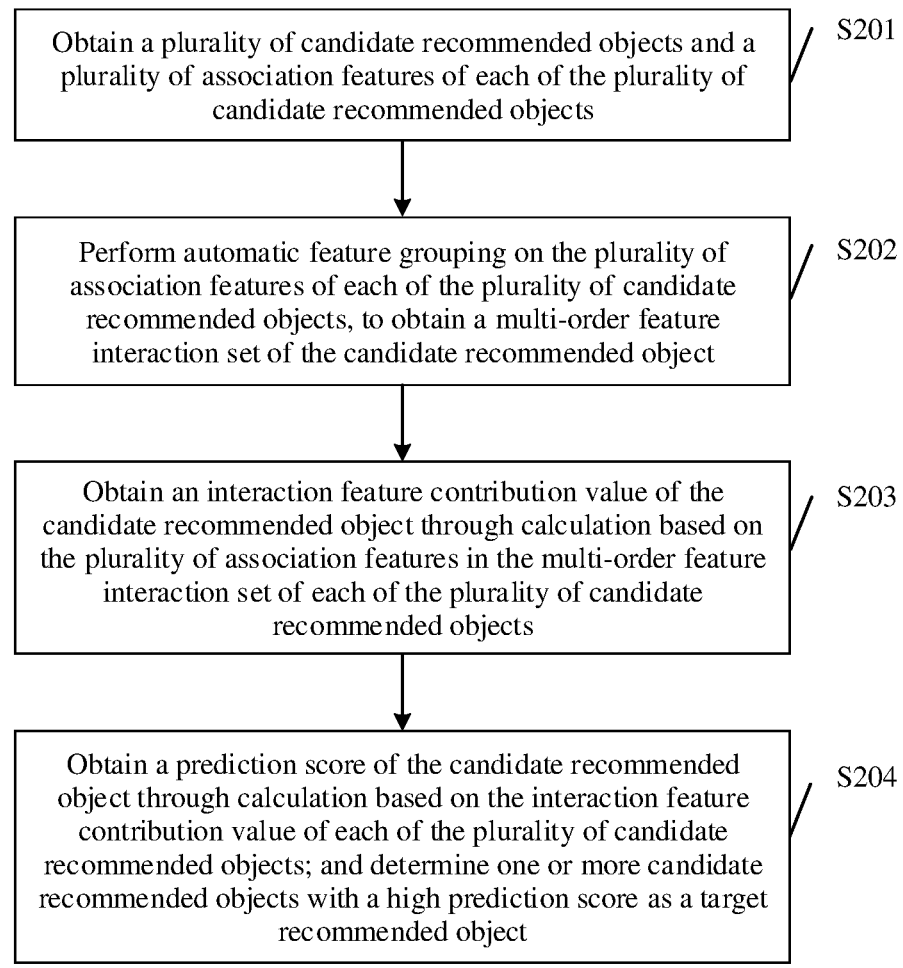
FIG. 2 is a schematic flowchart of a recommendation method based on automatic feature grouping according to an embodiment of this application.

FIG. 2 is a schematic flowchart of a recommendation method based on automatic feature grouping according to an embodiment of this application. As shown in FIG. 2, the method includes the following steps.

S201: Obtain a plurality of candidate recommended objects and a plurality of association features of each of the plurality of candidate recommended objects.

For example, the candidate recommended object may be an object previously clicked by a user, or an object related to an object previously clicked by a user. For example, the candidate recommended object is an application clicked and viewed by the user or an application previously downloaded by the user in an application store, or an application of a same type as an application previously clicked and downloaded by the user or an application clicked and viewed by the user. For another example, the candidate recommended object is news information clicked and viewed by the user or news information of a same type as news information clicked and viewed by the user.

The association feature of the candidate recommended object includes an attribute of the candidate recommended object. For example, if the candidate recommended object is an advertisement, an attribute of the advertisement includes an advertisement type, an advertisement brand, a place and time to display the advertisement, and the like. The association feature of the candidate recommended object may further include an attribute of the user, for example, information such as gender and age of the user. It is clear that the association feature of the candidate recommended object further includes other related information. This is not enumerated one by one herein.

It is assumed that the candidate recommended object is an advertisement, and the association feature of the advertisement may include a place and time to display the advertisement, and an advertisement brand. For another example, if the candidate recommended object is news, the association feature of the news may include a place and time to display the news, a brief introduction to the news, a user type, and the like.

Two pieces of simple advertisement click data are used as an example.

Beijing, Tuesday, 17:00, Nike

Shanghai, Sunday, 11:20, Kentucky Fried Chicken

Beijing and Nike are specific association features, and Shanghai and Beijing are specific features whose feature category is a city. The data indicates a place, a day of the week, and time to display the advertisement, and an advertisement brand. The second row shows that Kentucky Fried Chicken is pushed to a user in Shanghai at 11:20 a.m. on Sunday.

It should be noted herein that the candidate recommended objects and the plurality of association features of the candidate recommended object may be obtained from a log database of a recommendation apparatus, or may be obtained from a user terminal.

A prediction model is trained based on the data in the manner described in FIG. 1$b$.

S202: Perform automatic feature grouping on the plurality of association features of each of the plurality of candidate recommended objects, to obtain a multi-order feature interaction set of the candidate recommended object.

Each-order feature interaction set in a multi-order feature interaction set of any candidate recommended object A in the plurality of candidate recommended objects includes one or more feature interaction groups, and each of the one or more feature interaction groups includes at least one of a plurality of association features of the candidate recommended object A.

It should be noted herein that, in each feature interaction group in a $k^{th}$ order feature interaction set in the multi-order feature interaction set, a quantity of association features used in a non-linear mathematical operation is k, and k is an integer greater than 0.

Optionally, the performing automatic feature grouping on the plurality of association features of each of the plurality of candidate recommended objects, to obtain a multi-order feature interaction set of the candidate recommended object includes:

inputting the plurality of association features of each of the plurality of candidate recommended objects to an automatic feature grouping model for processing, to obtain the multi-order feature interaction set of each candidate recommended object.

Specifically, the inputting the plurality of association features of each of the plurality of candidate recommended objects to an automatic feature grouping model for processing, to obtain the multi-order feature interaction set of each candidate recommended object includes:

for $k^{th}$-order feature interaction set of the candidate recommended object A, obtaining an allocation probability of each of the plurality of association features of the candidate recommended object A, where the allocation probability of each of the plurality of association features of the candidate recommended object A is a probability that the association feature is allocated to a $j^{th}$ feature interaction group in the $k^{th}$-order feature interaction set, and the $j^{th}$ feature interaction group is any feature interaction group in the $k^{th}$-order feature interaction set; and obtaining the $k^{th}$-order feature interaction set of the candidate recommended object A based on the allocation probability of each of the plurality of association features of the candidate recommended object A.

The association feature is allocated to the $j^{th}$ feature interaction group in the $k^{th}$-order feature interaction set in uniform distribution, normal distribution, mean square distribution, or the like. Therefore, the allocation probability of the association feature may be obtained based on a uniform distribution probability function, a normal distribution probability function, or a mean square distribution probability function.

It should be noted that a grouping operation performed on the association feature based on the allocation probability of the association feature is a discrete process. Therefore, to make the grouping operation continuous, the allocation probability of the association feature is processed, to obtain a processed allocation value; and then the association feature is grouped based on the allocation value.

The association feature is allocated to the $j^{th}$ feature interaction group in the $k^{th}$-order feature interaction set in uniform distribution, normal distribution, mean square distribution, or the like. Therefore, the allocation probability of the association feature may be obtained based on a uniform distribution probability function, a normal distribution probability function, or a mean square distribution probability function.

It should be noted that a grouping operation performed on the association feature based on the allocation probability of the association feature is a discrete process. Therefore, to make the grouping operation continuous, the allocation probability of the association feature is processed, to obtain a processed probability, namely, an allocation value; and then the association feature is grouped based on the allocation value.

Optionally, a manner of processing the allocation probability of the association feature may be a Gumbel-Softmax operation or another operation. The allocation value may be represented as the following formula:

$$(\Pi_{i,j}^k)_o = \frac{\exp\left(\frac{\log \alpha_o + G_o}{\tau}\right)}{\sum_{o \in \{0,1\}} \exp\left(\frac{\log \alpha_o + G_o}{\tau}\right)}$$

$\alpha_0 = p_{i,j}^k$, and $\alpha_1 = 1 - p_{i,j}^k$. $\alpha_0$ indicates a probability that the $i^{th}$ association feature in the plurality of association features of the candidate recommended object A is not allocated to the $j^{th}$ feature interaction group in the $k^{th}$-order feature interaction set, $\alpha_1$ indicates a probability that the $i^{th}$ association feature in the plurality of association features of the candidate recommended object A is allocated to the $j^{th}$ feature interaction group in the $k^{th}$-order feature interaction set, and $G_o$ is a random number that complies with Gumbel distribution. In a training process, sampling may be performed on even distribution U (0, 1) according to the following formula:

$G_0 = -\log-\log u$ u complies with even distribution U (0, 1), and after a continuous grouping operation is performed, whether the $i^{th}$ association feature is allocated to the $j^{th}$ feature interaction group in the $k^{th}$-order feature interaction set is determined based on a value relationship between $(\Pi_{i,j}^k)_0$ and $(\Pi_{i,j}^k)_1$. In $(\Pi_{i,j}^k)_0$ and $(\Pi_{i,j}^k)_1$, a sum of $(\Pi_{i,j}^k)_0$ and $(\Pi_{i,j}^k)_1$ is 1. If $(\Pi_{i,j}^k)_0$ is larger, the $i^{th}$ association feature in the plurality of association features of the candidate recommended object is not allocated to the $j^{th}$ feature interaction group in the $k^{th}$-order feature interaction set. If $(\Pi_{i,j}^k)_1$ is larger, the $i^{th}$ association feature is allocated to the $j^{th}$ feature interaction group in the $k^{th}$-order feature interaction set. $(\Pi_{i,j}^k)_1$ is the allocation value. Optionally, when $(\Pi_{i,j}^k)_1$ is greater than the preset threshold, the $i^{th}$ association feature is allocated to the $j^{th}$ feature interaction group in the $k^{th}$-order feature interaction set. When $(\Pi_{i,j}^k)_1$ is not greater than the preset threshold, the $i^{th}$ association feature is not allocated to the $j^{th}$ feature interaction group in the $k^{th}$-order feature interaction set.

The preset threshold may be 0.5, 0.6, 0.7, or another value, and 0.5 is a priority.

It should be noted herein that the formula may be considered as an automatic feature grouping model.

After automatic feature grouping is performed on the plurality of association features of the candidate recommended object A, different feature interaction groups of each order are obtained. For example, it is assumed that the plurality of association features of the candidate recommended object A include age, gender, hour, a recently watched movie, a recently downloaded video, and a favorite star. Three feature interaction groups are set in a second-order feature interaction set. Possible grouping results are as follows:

Feature interaction group 1: {age, gender, favorite star}
Feature interaction group 2: {hour, recently downloaded video, recently watched movie}
Feature interaction group 3: {favorite star, recently watched movie, age}

S203: Obtain an interaction feature contribution value of the candidate recommended object through calculation based on the plurality of association features in the multi-order feature interaction set of each of the plurality of candidate recommended objects.

Specifically, for the multi-order feature interaction set of the candidate recommended object A, a $k^{th}$-order interaction result of each feature interaction group is obtained through calculation based on a plurality of association features of each feature interaction group in the $k^{th}$-order feature interaction set in the multi-order feature interaction set. The $k^{th}$-order feature interaction set is any-order feature interaction set in the multi-order feature interaction set. The interaction feature contribution value is obtained through calculation based on a corresponding-order feature interaction result of a feature interaction group in the multi-order feature interaction set.

Optionally, that a $k^{th}$-order interaction result of each feature interaction group is obtained through calculation based on a plurality of association features of each feature interaction group in the $k^{th}$-order feature interaction set in the multi-order feature interaction set may specifically include:

inputting the plurality of association features of each feature interaction group in the $k^{th}$-order feature interaction set in the multi-order feature interaction set to a feature interaction model for calculation, to obtain the $k^{th}$-order interaction result of each feature interaction group.

Specifically, the inputting the plurality of association features of each feature interaction group in the $k^{th}$-order feature interaction set in the multi-order feature interaction set to a feature interaction model for calculation, to obtain the $k^{th}$-order interaction result of each feature interaction group includes:

obtaining a feature vector of each association feature of the $j^{th}$ feature interaction group in the $k^{th}$-order feature interaction set and a weight corresponding to the feature vector, where the $j^{th}$ feature interaction group is any feature interaction group in the $k^{th}$-order feature interaction set; determining a feature value of the $j^{th}$ feature interaction group based on the feature vector of each association feature of the $j^{th}$ feature interaction group and the weight corresponding to the feature vector; and determining the $k^{th}$-order interaction result of the $j^{th}$ feature interaction group based on the feature vector of each association feature of the $j^{th}$ feature interaction group, the weight corresponding to the feature vector, and the feature value of the $j^{th}$ feature interaction group.

Optionally, the $k^{th}$-order interaction result of the $j^{th}$ feature interaction group may be represented as:

$$I_j^k = \begin{cases} (g_j^k)^k - \sum_{f_i \in s_j^k} (w_{i,j}^k e_i)^k \in R, k \geq 2 \\ g_j^k \in R^m, k = 1 \end{cases}$$

$g_j^k = \sum_{f_i \in s_j^k} w_{i,j}^k e_i$, $g_j^k$ is a feature value of $s_j^k$, $s_j^k$ is the $j^{th}$ feature interaction group in the $k^{th}$-order feature interaction set, $f_i$ is an $i^{th}$ association feature in a plurality of association features of a candidate recommended object A, $e_i$ is a feature vector, corresponding to $f_i$, whose dimension is m, $w_{i,j}^k$ is a weight of $e_i$ of the $j^{th}$ feature interaction group in the $k^{th}$-order feature interaction set, and $R^m$ is a feature vector set, corresponding to the feature vector, whose dimension is m.

A $k^{th}$ power operation $(v)^k$ on a feature vector v is defined as first performing a $k^{th}$ power operation on each number of the feature vector, to obtain a $k^{th}$ power result of each number; and then adding $k^{th}$ power results of all numbers, to obtain a real number.

For any feature group, an interaction relationship between internal features of the feature interaction group of a specific order is calculated according to the foregoing formula. For example, a feature interaction group in a second-order feature interaction set is {favorite star, recently watched movie, age}, and a feature value of the feature interaction group may be represented as:

$$(e_{favorite\ star} + e_{recently\ watched\ movie} + e_{age})^2$$
$$- e_{favorite\ star}^2 - e_{recently\ watched\ movie}^2 -$$
$$e_{age}^2 = e_{favorite\ star} \cdot e_{recently\ watched\ movie} +$$
$$e_{age} \cdot e_{recently\ watched\ movie} + e_{favorite\ star} \cdot e_{age}$$

It can be learned that a quantity of association features, in the feature interaction group, used in a non-linear mathematical operation is two, and the non-linear mathematical operation is a vector inner product operation.

For another example, if a feature interaction group in a third-order feature interaction set is {age, gender, favorite star}, a feature value of the feature interaction group may be represented as:

$$(e_{age} + e_{gender} + e_{favorite\ star})^3 - e_{age}^3 - e_{gender}^3$$
$$- e_{favorite\ star}^3 = e_{age}^2 \cdot e_{gender} + e_{age}^2 \cdot e_{favorite\ star}$$
$$+ e_{gender}^2 \cdot e_{favorite} + e_{gender}^2 \cdot e_{age}$$
$$+ e_{favorite\ star}^2 \cdot e_{gender} + e_{favorite\ star}^2 \cdot e_{age}$$
$$+ e_{gender} \cdot e_{favorite\ star} \cdot e_{age}$$

It can be learned that a quantity of association features, in the feature interaction group, used in a non-linear mathematical operation is three, and the non-linear mathematical operation is a vector inner product operation.

After the corresponding-order interaction result of the feature interaction group in the multi-order feature interaction set of the candidate recommended object A is obtained, an interaction feature vector of the candidate recommended object A is obtained based on the corresponding-order interaction result of the feature interaction group in the multi-order feature interaction set. The interaction feature vector of the candidate recommended object A is input to a neural network model for calculation, to obtain the interaction feature contribution value. The neural network model is obtained based on a fully connected neural network.

For example, the candidate recommended object A has feature interaction sets of three orders, and each-order feature interaction set includes two feature interaction groups. Feature values of two feature interaction groups in a first-order feature interaction set are $I_0^1$ and $I_1^1$, feature values of two feature interaction groups in a second-order feature interaction set are $I_0^2$ and $I_1^2$, feature values of two feature interaction groups in a third-order feature interaction set are $I_0^3$ and $I_1^3$, and an interaction feature vector corresponding to the third-order feature interaction set is $[I_0^1, I_1^1, I_0^2, I_1^2, I_0^3, I_1^3]$. Then, the interaction feature vector $[I_0^1, I_1^1, I_0^2, I_1^2, I_0^3, I_1^3]$ is input to the neural network model for calculation, to obtain the interaction feature contribution value of the candidate recommended object A.

After the interaction feature vector of the candidate recommended object A is obtained, the interaction feature vector is used as an input of the neural network model, and a value of each neuron node is calculated layer by layer. Finally, the neural network model outputs the interaction feature contribution value of the candidate recommended object.

Figure 3:
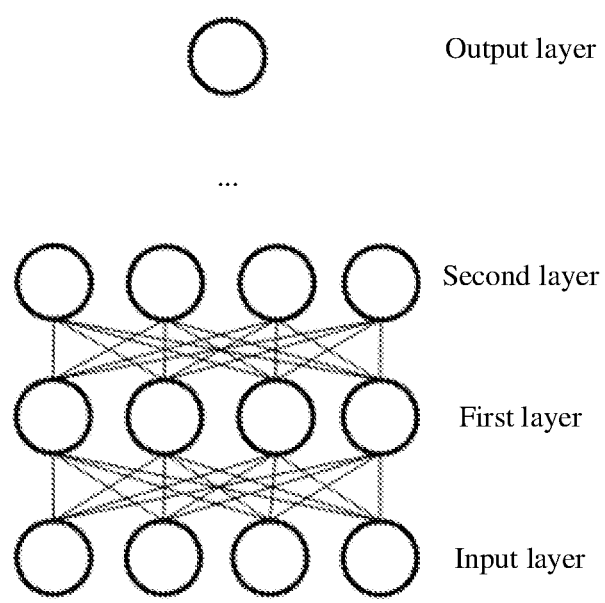
FIG. 3 is a schematic diagram of a neural network model according to an embodiment of this application.

As shown in FIG. 3, an input layer of the neural network is a bottom layer of the entire network, and the output layer is a top layer. Each layer of neuron in the neural network is connected to one or more neurons at an adjacent layer, and each link includes a weight and an offset. During calculation, the neural network performs calculation from a lower layer to an upper layer starting from the input layer. A value of each neuron is determined based on a value of a neuron that is at a next layer and that is connected to the neuron. A contribution value of each lower-layer neuron to the neuron connected to the lower-layer neuron is obtained after a value of the lower-layer neuron is multiplied by a weight of a corresponding link plus an offset. A value of the neuron is obtained through obtaining a sum of contribution values of all lower-layer neurons and calculating by using an activation function (which is usually a non-linear function for mapping all real numbers to a fixed interval, to ensure that the value of each neuron falls within a fixed range). The foregoing process is repeated until a value of the neuron at the output layer is obtained through calculation, and the value is the output of the entire neural network. The output of the neural network is the interaction feature contribution value.

S204: Obtain a prediction score of the candidate recommended object through calculation based on the interaction feature contribution value of each of the plurality of candidate recommended objects; and determine one or more candidate recommended objects with a high prediction score as a target recommended object.

Optionally, a prediction score of each candidate recommended object is the interaction feature contribution value of the candidate recommended object.

Optionally, when k is greater than 1, the interaction feature contribution value of the candidate recommended object A does not cover first-order feature interaction information of the candidate recommended object A. Therefore, the prediction score of the candidate recommended object A may be obtained through performing weighted summation based on the interaction feature contribution value and a first-order contribution value of the candidate recommended object.

Optionally, the first-order contribution value of the candidate recommended object A may be obtained in the following manner:

obtaining an ID of each of the plurality of association features of the candidate recommended object A; obtaining a contribution value of each association feature based on the ID of each of the plurality of association features of the candidate recommended object A; and determining the first-order contribution value based on the contribution value of each of the plurality of association features of the candidate recommended object A and a reference contribution value, where the first-order contribution value is a sum of contribution values of the plurality of association features of the candidate recommended object A and the reference contribution value.

Specifically, after the plurality of association features of the candidate recommended object A are obtained, ID processing is performed on the plurality of association features of the candidate recommended object A, to obtain the ID of each of the plurality of association features of the candidate recommended object A. Then, a feature category corresponding to each association feature is determined based on the ID of each association feature, and the contribution value corresponding to the association feature is determined based on the feature category corresponding to the association feature. The first-order contribution value is obtained based on a plurality of contribution values corresponding to the plurality of association features and the reference contribution value.

The prediction score of the candidate recommended object is determined based on the first-order contribution value and the interaction feature contribution value. The prediction score of the candidate recommended object may be a sum of the first-order contribution value and the interaction feature contribution value, or may be a weighted sum of the first-order contribution value and the interaction feature contribution value, and a weight is preset.

For example, the prediction score=k1×first-order contribution value+k2×interaction feature contribution value. The formula may be considered as a prediction integration model, where k1 and k2 are parameters of the prediction model.

In the foregoing method, a prediction score of each of the plurality of candidate recommended objects may be obtained, one or more corresponding candidate recommended objects with a high prediction score in the plurality of candidate recommended objects are determined as the target recommended object, and the target recommended object is pushed to the user terminal.

Optionally, when the user clicks one target recommended object, the user terminal feeds back the recommended object clicked by the user to the recommendation apparatus for subsequent training of the prediction model.

By using the automatic machine learning technology, important association features are placed in a corresponding feature interaction group, and then the designed interaction function is used for each feature interaction group, to generate a feature value of a specific order. In this method, an important feature combination can be automatically searched for from association features, and a useless feature combination is removed. This can avoid an operation of obtaining specific-order interaction through enumeration based on an original feature in the conventional technology, and simplify parameter complexity of a model. In addition, in comparison with the conventional technology, the interaction function provided in this application can efficiently calculate a feature value of each feature interaction group of a specific order, to enable the interaction function to be applied to an actual scenario.

Offline experiments are performed on the technologies in this application, and several existing technologies (logistic regression (LR) technology, gradient-boosted decision tree (GBDT) technology, FM, FFM, AFM, DeepFM, IPNN, PIN, xDeepFM, and FGCNN) are compared. Three public datasets are used: Criteo, Avazu, and iPinyou. The Criteo dataset includes advertisement click records in one month. In this experiment, data on the sixth day is selected as a training set, and data on the thirteenth day is selected as a test set. In addition, down-sampling is performed on negative samples, to ensure that a ratio of positive samples to negative samples in a final dataset is 1:1. For the Avazu dataset, 80% of data in a public dataset is randomly selected as a training set, and the remaining 20% data is selected as a test set. In addition, a category that appears less than 20 times in data samples is deleted. The iPinyou dataset is small and provides a training set and a test set. Therefore, the iPinyou dataset can be directly used in this experiment. Industry-recognized test indicators AUC and Logloss are selected. After the experiment, the following conclusions are drawn:

1. In this application, best experimental results are obtained on a plurality of real datasets, and in comparison with the FGCNN model, the AUC is improved by 0.07% to 0.5%.
2. Analysis is performed from a perspective of feature modeling. Compared with best models in the industry such as xDeepFM, PIN, and FGCNN, the prediction model in this application can automatically select, instead of performing enumeration, an important higher-order feature combination from data. Therefore, the prediction model can focus on optimizing selected feature interaction during training and using. This can improve performance of the model. In addition, compared with another model, the prediction model in this application can alleviate overfitting during training.

It can be learned that in the solution of this application, important higher-order interaction information in association features can be automatically searched for through automatic feature grouping, to improve recommendation accuracy. Specific-order feature interaction in any specific group may be generated by using the designed interaction function. The interaction function is implemented in an efficient and simple way, and can be promoted in different recommendation tasks. An interaction feature vector is further processed by using a neural network, to extract potential feature interaction information, in the association features, that is difficult to extract. This can further improve recommendation accuracy.

It should be noted herein that for different recommendation scenarios, for example, news and an application store, automatic feature grouping can be implemented by using different technical solutions. This can implement a specific model requirement and improve model scalability.

Figure 4:
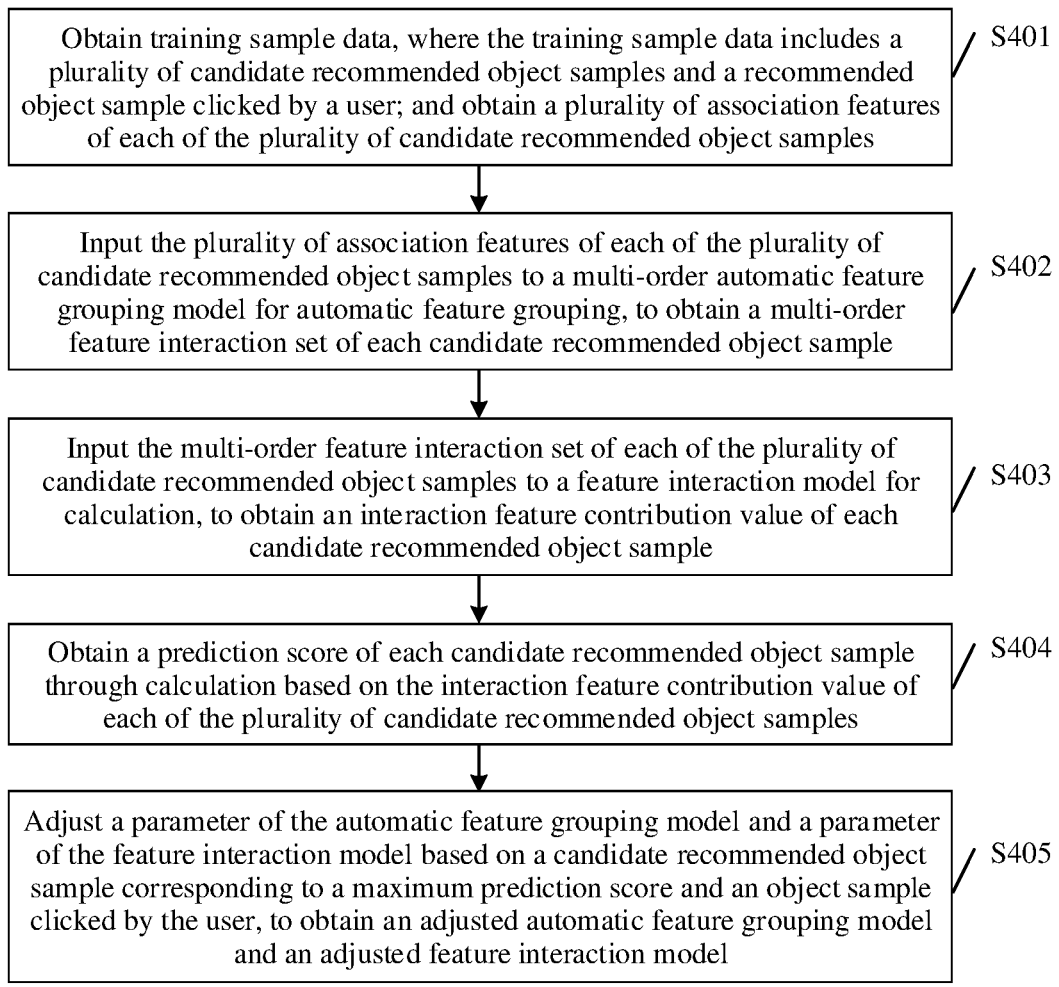
FIG. 4 is a schematic diagram of a structure of a recommendation apparatus according to an embodiment of this application.

FIG. 4 is a schematic flowchart of a training method based on a prediction model according to an embodiment of this application. As shown in FIG. 4, the method includes the following steps.

S401: Obtain training sample data, where the training sample data includes a plurality of candidate recommended object samples and a recommended object sample clicked by a user; and obtain a plurality of association features of each of the plurality of candidate recommended object samples.

S402: Input the plurality of association features of each of the plurality of candidate recommended object samples to a multi-order automatic feature grouping model for automatic feature grouping, to obtain a multi-order feature interaction set of each candidate recommended object sample.

Each-order feature interaction set in a multi-order feature interaction set of any candidate recommended object sample B in the plurality of candidate recommended object samples includes one or more feature interaction groups, each of the one or more feature interaction groups includes at least one of a plurality of association features of the candidate recommended object sample B, in each feature interaction group in a $k^{th}$-order feature interaction set in the multi-order feature interaction set, a quantity of association features used in a non-linear mathematical operation is k, and k is an integer greater than 0.

Optionally, the non-linear mathematical operation may be a vector inner product operation, matrix multiplication, or a non-linear mathematical operation in another form.

The plurality of candidate recommended object samples may be special-purpose training data during training, or candidate recommended object samples during historical recommendation.

Optionally, the inputting the plurality of association features of each of the plurality of candidate recommended object samples to an automatic feature grouping model for multi-order automatic feature grouping, to obtain a multi-order feature interaction set of each candidate recommended object sample includes:

for $k^{th}$-order feature interaction set of the candidate recommended object sample B, obtaining an allocation probability of each of the plurality of association features of the candidate recommended object sample B, where the allocation probability of each of the plurality of association features of the candidate recommended object sample B is a probability that the association feature is allocated to a $j^{th}$ feature interaction group in the $k^{th}$-order feature interaction set, and the $j^{th}$ feature interaction group is any feature interaction group in the $k^{th}$-order feature interaction set; and obtaining the $k^{th}$-order feature interaction set of the candidate recommended object sample B based on the allocation probability of each of the plurality of association features of the candidate recommended object sample B.

Further, the obtaining the $k^{th}$-order feature interaction set of the candidate recommended object sample B based on the allocation probability of each of the plurality of association features of the candidate recommended object sample B includes:

determining an allocation value of the association feature based on the allocation probability of each of the plurality of association features of the candidate recommended object sample B, where the allocation value is a probability that each association feature is allocated to the $j^{th}$ feature interaction group in the $k^{th}$-order feature interaction set; and if the allocation value of the association feature is greater than a preset threshold, allocating the association feature to the $j^{th}$ feature interaction group in the $k^{th}$-order feature interaction set, or if the allocation value of the association feature is not greater than a preset threshold, skipping allocating the association feature to the $j^{th}$ feature interaction group in the $k^{th}$-order feature interaction set.

S403: Input the multi-order feature interaction set of each of the plurality of candidate recommended object samples to a feature interaction model for calculation, to obtain an interaction feature contribution value of each candidate recommended object sample.

Optionally, in a possible embodiment, the inputting the multi-order feature interaction set of each of the plurality of candidate recommended object samples to a feature interaction model for calculation, to obtain an interaction feature contribution value of each candidate recommended object sample includes:

for the multi-order feature interaction set of the candidate recommended object sample B, obtaining a $k^{th}$-order interaction result of the feature interaction group through calculation based on association features of each feature interaction group in the $k^{th}$-order feature interaction set, where the $k^{th}$-order feature interaction set is any-order feature interaction set in the multi-order feature interaction set of the candidate recommended object sample B; and obtaining the interaction feature contribution value of the candidate recommended object sample B through calculation based on a corresponding-order interaction result of a feature interaction group in the multi-order feature interaction set of the candidate recommended object sample B.

Optionally, the obtaining a $k^{th}$-order interaction result of the feature interaction group through calculation based on association features of each feature interaction group in the $k^{th}$-order feature interaction set includes:

obtaining a feature vector of each association feature of the $j^{th}$ feature interaction group in the $k^{th}$-order feature interaction set and a weight corresponding to the feature vector, where the $j^{th}$ feature interaction group is any feature interaction group in the $k^{th}$-order feature interaction set; performing weighted summation on the feature vector of each association feature of the $j^{th}$ feature interaction group and the weight corresponding to the feature vector, to obtain a feature value of the $j^{th}$ feature interaction group; and determining the $k^{th}$-order interaction result of the $j^{th}$ feature interaction group based on the feature vector of each association feature of the $j^{th}$ feature interaction group, the weight corresponding to the feature vector, and the feature value of the $j^{th}$ feature interaction group.

Optionally, the obtaining the interaction feature contribution value of the candidate recommended object sample B through calculation based on a corresponding-order interaction result of a feature interaction group in the multi-order feature interaction set of the candidate recommended object sample B includes:

obtaining an interaction feature vector based on the corresponding-order interaction result of the feature interaction group in the multi-order feature interaction set of the candidate recommended object sample B; and inputting the interaction feature vector to a neural network model for calculation, to obtain the interaction feature contribution value of the candidate recommended object sample B, where the neural network model is obtained based on a fully connected neural network.

S404: Obtain a prediction score of each candidate recommended object sample through calculation based on the interaction feature contribution value of each of the plurality of candidate recommended object samples.

S405: Adjust a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model.

Optionally, the adjusting a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model includes:

adjusting the parameter of the automatic feature grouping model, the parameter of the feature interaction model, and a parameter of the neural network model based on the candidate recommended object sample corresponding to the maximum prediction score and the object sample clicked by the user, to obtain an adjusted automatic feature grouping model, an adjusted feature interaction model, and an adjusted neural network model.

It should be noted herein that for specific descriptions of step S402 to step S404, refer to related descriptions of step S202 to step S204. Details are not described herein again.

Figure 5:
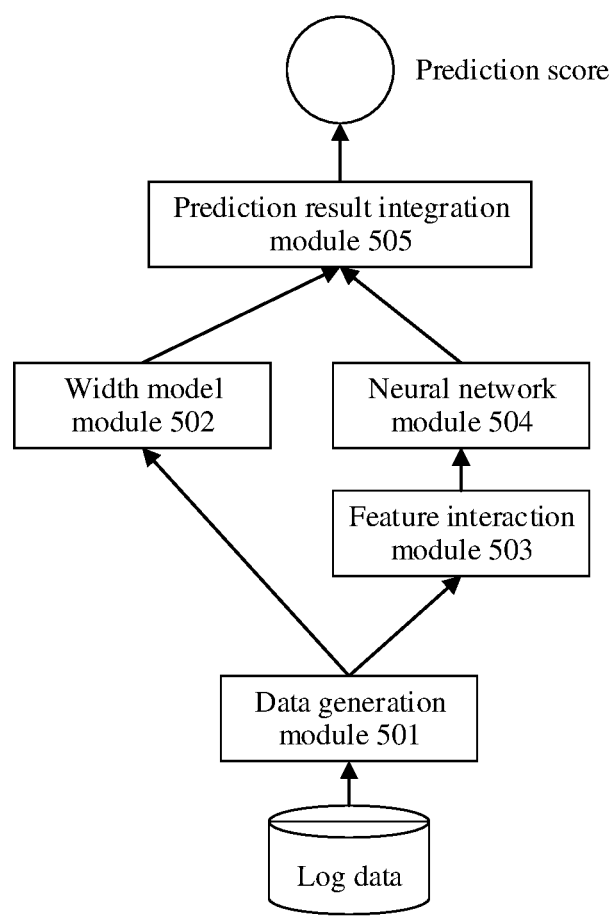
FIG. 5 is a schematic diagram of a structure of another recommendation apparatus according to an embodiment of this application.

FIG. 5 is a schematic diagram of a structure of a recommendation apparatus 500 based on automatic feature grouping according to an embodiment of this application. As shown in FIG. 5, the recommendation apparatus 500 includes:

a data generation module 501, configured to: obtain a recommended object from a log; collect environment information at a prediction moment; and extract each association feature based on a predefined format, and obtain an ID of the association feature;

a width model module 502, configured to: obtain a contribution value of each association feature and a reference contribution value based on the association feature and the ID that are provided by the data generation module 501; and add the contribution value of each association feature and the reference contribution value, to obtain a first-order contribution value;

a feature interaction module 503, configured to perform automatic feature grouping and feature interaction, where when performing automatic feature grouping, the module allocates a plurality of association features of the candidate recommended object that are provided by the data generation module 501 to a feature interaction group of an each-order feature interaction set, and when performing feature interaction, the module generates a feature value of a feature interaction group of an each-order feature interaction set based on a designed interaction function;

a neural network module 504, configured to input the feature value of the feature interaction group generated by the feature interaction module 503 to a multi-layer neural network for calculation, to obtain an interaction feature contribution value; and a prediction result integration module 505, configured to: receive the first-order contribution value output by the width model module 502 and the interaction feature contribution value output by the neural network module 504; and add the two values based on weights, to output a final prediction score.

Figure 6:
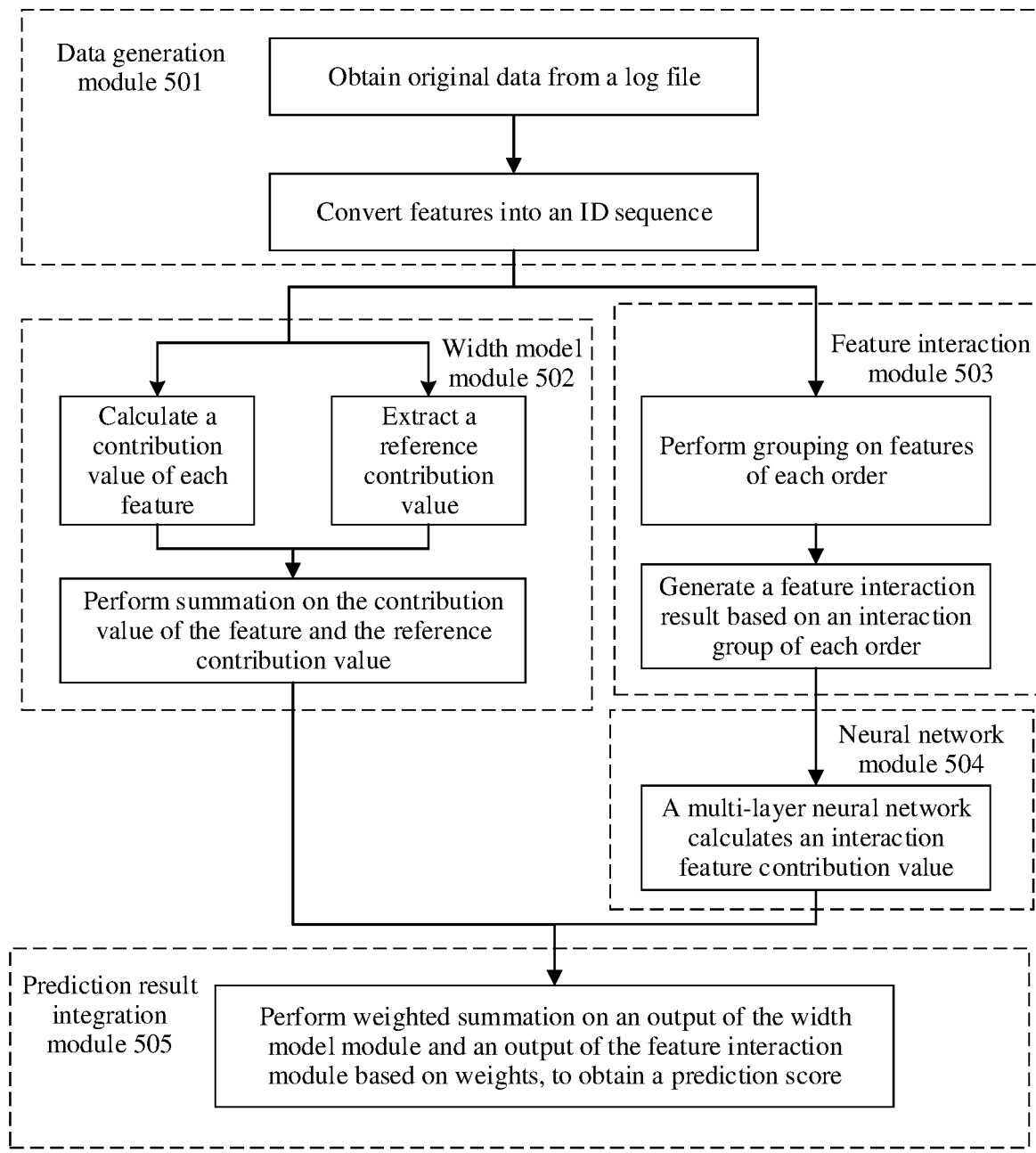
FIG. 6 is a schematic flowchart of a training method based on a prediction model according to an embodiment of this application.

Specifically, as shown in FIG. 6, after receiving a prediction request, the data generation module 501 extracts the association features, for example, feature data corresponding to a user and an advertisement and environment feature data, of the candidate recommended object from a log file; performs ID processing on all association features, to obtain a unique ID in each feature category; and arranges all IDs of the association features based on a predefined feature sequence (for example, a first feature is a week, and a second feature is a place) for combination, to generate a feature ID sequence, so as to meet input requirements of the width model module 502 and the feature interaction module 503.

The width model module 502 pre-obtains and stores contribution values of all association features to a prediction result through training of a learning module based on historical data, and stores the reference contribution value. After receiving the feature ID sequence generated by the data generation module 501, the width model module 502 determines, based on a location of the feature ID in the entire sequence, a feature category corresponding to the ID, and searches, based on the corresponding feature category, for a contribution value corresponding to a feature indicated by the ID. Then, the width model module 502 performs summation on the contribution value of the association feature obtained based on an ID sequence index and the reference contribution value, to obtain the first-order contribution value.

The feature interaction module 503 performs automatic feature grouping on the association feature by using the AutoML technology, and searches for an important feature interaction group of each order; then obtains a feature value of the feature interaction group of each order based on the interaction function; and then obtains an interaction feature vector based on the feature value of the feature interaction group of each order.

It should be noted herein that for specific steps performed by the feature interaction module 503, refer to related descriptions of step S202 and step S203. Details are not described herein again.

The neural network module 504 inputs the interaction feature vector output by the feature interaction module 503 to a trained multi-layer neural network for calculation, to obtain an interaction feature contribution value. The neural network model is obtained based on a fully connected neural network.

The prediction result integration module 505 performs weighted summation on the first-order contribution value output by the width model module 502 and the interaction feature contribution value output by the neural network module 504, to obtain a prediction score.

In a specific application scenario, a recommended advertisement is used as an example for description.

To simplify the scenario, a quantity of association features of a candidate recommended object is reduced to 5: an advertisement, an advertisement category, a user, a city, and time. An output of this application is a prediction score of behavior of clicking the advertisement by the user, and a higher prediction score indicates a higher possibility of recommending the advertisement to the user.

It is assumed that an ID corresponding to a feature of the advertisement is 7, an ID corresponding to the advertisement category is 12, an ID corresponding to the user is 35, an ID corresponding to the city is 48, and an ID corresponding to the time is 8. An ID sequence generated by the data generation module 501 is 7, 12, 35, 48, 8.

The width model module 502 first obtains, by indexing the stored data and based on the obtained ID sequence, contribution values $c_{0,\ 7}$, $c_{1,\ 12}$, $c_{2,\ 35}$, $c_{3,\ 48}$, and $c_{4,\ 8}$ respectively corresponding to the ID 7 corresponding to the advertisement, the ID 12 corresponding to the advertisement category, the ID 35 corresponding to the user, the ID 48 corresponding to the city, and the ID 8 corresponding to the time. A first bit of the subscript herein indicates a feature category, namely, a location of the feature in the ID sequence, and a second bit indicates an ID of the feature in a specific feature category. Features of different categories may have a same ID, and different feature IDs of a same category are different and unique. In addition to the contribution value corresponding to each feature, the width model module 502 further stores the reference contribution value cg. A final output (namely, the first-order contribution value) of the width model module 502 is:

$$\text{out}_{502}=c_{0,7}+c_{1,12}+c_{2,35}+c_{3,48}+c_{4,8}$$

A processing process of the feature interaction module 503 is as follows: First, five association features are classified into different feature interaction groups of each order:
- a first-order feature interaction group is {advertisement, advertisement category}, {user, city};
- a second-order feature interaction group is {advertisement, advertisement category, user}, {city, advertisement}; and
- a third-order feature interaction group is {advertisement, advertisement category, user}, {advertisement, user, city}.

After the groups are obtained, a feature vector $e_{0,7}$ corresponding to a feature of the ID 7 corresponding to the advertisement, a feature vector $e_{1,12}$ corresponding to a feature of the ID 12 corresponding to the advertisement category, a feature vector $e_{2,35}$ corresponding to a feature of the ID 35 corresponding to the user, a feature vector $e_{3,48}$ corresponding to a feature of the ID 48 corresponding to the city, and a feature vector $e_{4,8}$ corresponding to a feature of the ID 8 corresponding to the time are obtained through indexing the stored data. A meaning of the subscript herein is similar to that in the width model module 502. Then, the feature vector is mapped to a feature group of each order.

First order: $\{e_{0,7}, e_{1,12}\}, \{e_{2,35}, e_{3,48}\}$;
Second order: $\{e_{0,7}, e_{1,12}, e_{2,35}\}, \{e_{3,48}, e_{0,7}\}$; and
Third order: $\{e_{0,7}, e_{1,12}, e_{2,35}\}, \{e_{0,7}, e_{2,35}, e_{3,48}\}$.

Interaction results of different feature interaction groups of each order are obtained through calculation according to the following formula:

$$I_j^k = \begin{cases} (g_j^k)^k - \sum_{f_i \in s_j^k} (w_i^k e_i)^k \in R^m, k \geq 2 \\ g_j^k \in R^m, k = 1 \end{cases}$$

$I_j^k$ is an interaction result of a $j^{th}$ feature interaction group of a $k^{th}$ order, $g_j^k$ is a feature value of the $j^{th}$ feature interaction group of the $k^{th}$ order, $s_j^k$ is the $j^{th}$ feature interaction group in a $k^{th}$-order feature interaction set, $f_i$ is an $i^{th}$ feature in the five association features, et is a vector of $f_i$ whose corresponding dimension is m, and $w_i^k$ is a weight of et in $s_j^k$.

An interaction result of each feature interaction group of each order may be obtained according to the foregoing formula. For example, an interaction result of a first feature interaction group of a first order is $I_0^1=0,7+e_{1,12}$, and an interaction result of a first feature interaction group of a second order is $13=(e_{0,7}+e_{1,12}+e_{2,35})^2-(e_{0,7})_2-(e_{1,12})^2-(e_{2,35})^2$. An interaction result of a first feature interaction group of a third order may be $I_0^3=(e_{0,7}+e_{1,12}+e_{2,35})^2-(e_{0,7})^3-(e_{1,12})^3-(e_{2,35})^3$.

It should be noted herein that, for a first-order feature interaction group, an interaction result of the first-order feature interaction group is a vector, and for a second-order or higher-order feature interaction group, an interaction result corresponding to the second-order or higher-order feature interaction group is a value.

Finally, the feature interaction module 503 splices interaction results of feature interaction groups of different orders into one vector:

$$V_{feature}=[I_0^1, I_1^1, I_0^2, I_1^2, I_0^3, I_1^3]$$

The vector $V_{feature}$ may be referred to as an interaction feature vector. After the interaction feature vector $V_{feature}$ is obtained, the vector is input to the neural network module 504.

The neural network module 504 calculates the interaction feature vector by using a neural network model obtained through training, to obtain the feature interaction contribution value. Specifically, the trained neural network model is a weight and an offset in a trained neural network. A value of a neuron at an output layer is obtained through calculation layer by layer based on a trained weight and offset, and the value is the feature interaction contribution value.

If $r^h$ indicates a neuron at an $h^{th}$ layer, $W^h$ is a weight of a connection line between the neuron at the $h^{th}$ layer and a neuron at an $(h+1)^{th}$ layer, $b^h$ is an offset of a corresponding connection line, and A is an activation function, a calculation formula of the neuron at the $h^{th}$ layer in the neural network is as follows:

$$r^{h+1}=A(W^h r^h+b^h)$$

If the neural network has H layers in total, a value of a neuron at a final output layer is a feature interaction contribution value, namely, an output of the neural network module 504:

$$\text{out}_{504}=r^H=A(W^{H-1}r^{H-1}+b^{H-1})$$

A processing process of the prediction result integration module 505 is as follows: After an output result $\text{out}_{502}$ of the width model module 502 and the output result $\text{out}_{504}$ of the neural network module 504 are obtained, weighted summation is performed on the output results of the two modules based on weights $k_{502}$ and $k_{504}$ that are obtained through pre-training, to obtain a prediction score of clicking the advertisement 7 of the advertisement category 12 by the user 35 in the city 48 at the moment 8:

$$p=\text{out}_{502}*k_{502}+\text{out}_{504}*k_{504}$$

Finally, the prediction score may be used to determine whether to recommend the advertisement 7 of the advertisement category 12 to the user, or whether to recommend the advertisement 7 of the advertisement category 12 to the user 35 in the city 48 at the moment 8.

Figure 7:
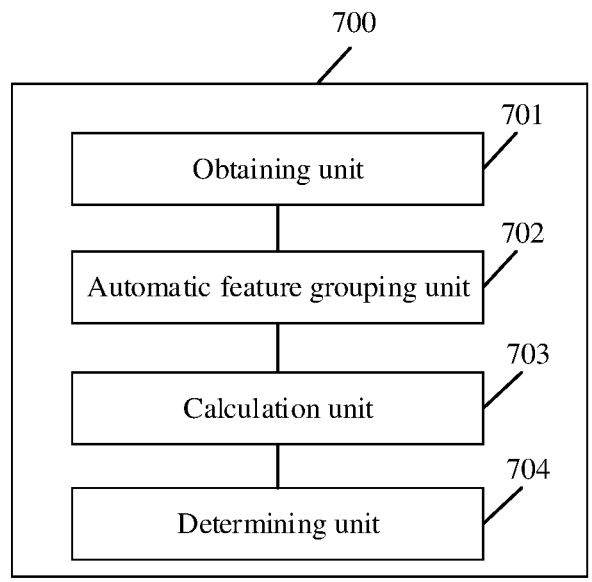
FIG. 7 is a schematic diagram of a structure of another recommendation apparatus according to an embodiment of this application.

FIG. 7 is a schematic diagram of a structure of another recommendation apparatus 700 based on automatic feature grouping according to an embodiment of this application. As shown in FIG. 7, the recommendation apparatus 700 includes:
- an obtaining unit 701, configured to obtain a plurality of candidate recommended objects and a plurality of association features of each of the plurality of candidate recommended objects;
- an automatic feature grouping unit 702, configured to perform automatic feature grouping on the plurality of association features of each of the plurality of candidate recommended objects, to obtain a multi-order feature interaction set of each candidate recommended object, where each-order feature interaction set in the multi-order feature interaction set of each of the plurality of candidate recommended objects includes one or more feature interaction groups, each of the one or more feature interaction groups includes at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0;

a calculation unit 703, configured to: obtain an interaction feature contribution value of each candidate recommended object through calculation based on the plurality of association features in the multi-order feature interaction set of each of the plurality of candidate recommended objects; and obtain a prediction score of each candidate recommended object through calculation based on the interaction feature contribution value of each of the plurality of candidate recommended objects; and a determining unit 704, configured to determine one or more corresponding candidate recommended objects with a high prediction score in the plurality of candidate recommended objects as a target recommended object.

In a possible embodiment, when obtaining the interaction feature contribution value of each candidate recommended object through calculation based on the plurality of association features in the multi-order feature interaction set of each of the plurality of candidate recommended objects, the calculation unit 703 is further configured to:

for the multi-order feature interaction set of each of the plurality of candidate recommended objects, obtain a $k^{th}$-order interaction result of each feature interaction group through calculation based on a plurality of association features of each feature interaction group in the $k^{th}$-order feature interaction set; and obtain the interaction feature contribution value of the candidate recommended object through calculation based on a corresponding-order interaction result of a feature interaction group in the multi-order feature interaction set of the candidate recommended object.

In a possible embodiment, when obtaining the $k^{th}$-order interaction result of the feature interaction group through calculation based on the plurality of association features of each feature interaction group in the $k^{th}$-order feature interaction set, the calculation unit 703 is further configured to:

input the plurality of association features of each feature interaction group in the $k^{th}$-order feature interaction set to a feature interaction model for calculation, to obtain the $k^{th}$-order interaction result of each feature interaction group.

In a possible embodiment, when inputting the plurality of association features of each feature interaction group in the $k^{th}$-order feature interaction set to the feature interaction model for calculation, to obtain the $k^{th}$-order interaction result of each feature interaction group, the calculation unit 703 is configured to:

perform the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of each candidate recommended object through calculation based on the corresponding-order interaction result of the feature interaction group in the multi-order feature interaction set of each candidate recommended object, the calculation unit 703 is configured to:

obtain an interaction feature vector based on the corresponding-order interaction result of the feature interaction group in the multi-order feature interaction set of each candidate recommended object; and input the interaction feature vector to a neural network model for calculation, to obtain the interaction feature contribution value of the candidate recommended object, where the neural network model is obtained based on a fully connected neural network.

In a possible embodiment, the automatic feature grouping unit 702 is further configured to:

input the plurality of association features of each of the plurality of candidate recommended objects to an automatic feature grouping model for processing, to obtain the multi-order feature interaction set of each candidate recommended object.

The automatic feature grouping unit 702 is further configured to:

for $k^{th}$-order feature interaction set of each candidate recommended object, obtain an allocation probability of each of the plurality of association features of each candidate recommended object, where the allocation probability of each of the plurality of association features of the candidate recommended object is a probability that each association feature is allocated to a $j^{th}$ feature interaction group in the $k^{th}$-order feature interaction set, and the $j^{th}$ feature interaction group is any feature interaction group in the $k^{th}$-order feature interaction set; and obtain the $k^{th}$-order feature interaction set of each candidate recommended object based on the allocation probability of each of the plurality of association features of each candidate recommended object.

Further, when obtaining the $k^{th}$-order feature interaction set of the candidate recommended object based on the allocation probability of each of the plurality of association features of the candidate recommended object, the automatic feature grouping unit 702 is further configured to:

determine an allocation value of the association feature based on the allocation probability of each of the plurality of association features of the candidate recommended object, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

Optionally, the non-linear mathematical operation may be a vector inner product operation, matrix multiplication, or another non-linear mathematical operation.

It should be noted that the foregoing units (the obtaining unit 701, the automatic feature grouping unit 702, the calculation unit 703, and the determining unit 704) are configured to perform related content of the method shown in step S201 to step S204.

In this embodiment, the recommendation apparatus 700 is presented in a form of a unit. The "unit" herein may be an application-specific integrated circuit (application-specific integrated circuit, ASIC), a processor and a memory for executing one or more software or firmware programs, an integrated logic circuit, and/or another device that can provide the foregoing functions. In addition, the obtaining unit 701, the automatic feature grouping unit 702, the calculation unit 703, and the determining unit 704 in the recommendation apparatus 700 may be implemented by using a processor 901 of a recommendation apparatus shown in FIG. 9.

Figure 8:
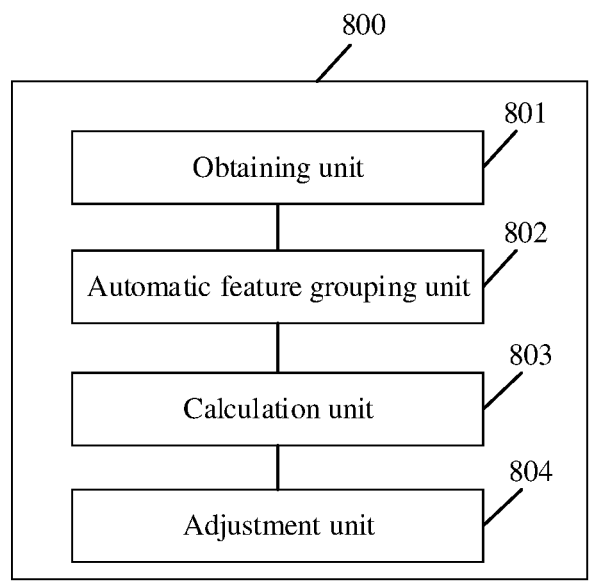
FIG. 8 is a schematic diagram of a structure of a training device based on a prediction model according to an embodiment of this application.

FIG. 8 is a schematic diagram of a structure of a training device 800 based on a prediction model according to an embodiment of this application. As shown in FIG. 8, the training device 800 includes:

an obtaining unit 801, configured to obtain training sample data, where the training sample data includes a plurality of candidate recommended object samples and a recommended object sample clicked by a user; and obtain a plurality of association features of each of the plurality of candidate recommended object samples;

an automatic feature grouping unit 802, configured to input the plurality of association features of each of the plurality of candidate recommended object samples to a multi-order automatic feature grouping model for automatic feature grouping, to obtain a multi-order feature interaction set of each candidate recommended object sample, where each-order feature interaction set in the multi-order feature interaction set of each of the plurality of candidate recommended object samples includes one or more feature interaction groups, each of the one or more feature interaction groups includes at least one of the plurality of association features of the candidate recommended object sample, in each feature interaction group in a $k^{th}$-order feature interaction set in the multi-order feature interaction set, a quantity of association features used in a non-linear mathematical operation is k, and k is an integer greater than 0;

a calculation unit 803, configured to: input the multi-order feature interaction set of each of the plurality of candidate recommended object samples to a feature interaction model for calculation, to obtain an interaction feature contribution value of each candidate recommended object sample; and obtain a prediction score of each candidate recommended object sample through calculation based on the interaction feature contribution value of each of the plurality of candidate recommended object samples; and an adjustment unit 804, configured to adjust a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model.

Optionally, the non-linear mathematical operation may be a vector inner product operation, matrix multiplication, or another non-linear mathematical operation.

In a possible embodiment, when inputting the multi-order feature interaction set of each of the plurality of candidate recommended object samples to the feature interaction model for calculation, to obtain the interaction feature contribution value of each candidate recommended object sample, the calculation unit 803 is further configured to:

for the multi-order feature interaction set of each candidate recommended object sample, obtain a $k^{th}$-order interaction result of the feature interaction group through calculation based on association features of each feature interaction group in the $k^{th}$-order feature interaction set, where the $k^{th}$-order feature interaction set is any-order feature interaction set in the multi-order feature interaction set of the candidate recommended object sample; and obtain the interaction feature contribution value of the candidate recommended object sample B through calculation based on a corresponding-order interaction result of a feature interaction group in the multi-order feature interaction set of the candidate recommended object sample.

In a possible embodiment, when obtaining the $k^{th}$-order interaction result of the feature interaction group through calculation based on the association features of each feature interaction group in the $k^{th}$-order feature interaction set, the calculation unit 803 is further configured to:

perform the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of the candidate recommended object sample through calculation based on the corresponding-order interaction result of the feature interaction group in the multi-order feature interaction set of the candidate recommended object sample, the calculation unit 803 is further configured to:

obtain an interaction feature vector based on the corresponding-order interaction result of the feature interaction group in the multi-order feature interaction set of each candidate recommended object sample; and input the interaction feature vector to a neural network model for calculation, to obtain the interaction feature contribution value of the candidate recommended object sample, where the neural network model is obtained based on a fully connected neural network.

In a possible embodiment, the adjustment unit 804 is further configured to:

adjust the parameter of the automatic feature grouping model, the parameter of the feature interaction model, and a parameter of the neural network model based on the candidate recommended object sample corresponding to the maximum prediction score and the object sample clicked by the user, to obtain an adjusted automatic feature grouping model, an adjusted feature interaction model, and an adjusted neural network model.

Optionally, the automatic feature grouping unit 802 is further configured to:

for $k^{th}$-order feature interaction set of each candidate recommended object sample, obtain an allocation probability of each of the plurality of association features of the candidate recommended object sample, where the allocation probability of each of the plurality of association features of the candidate recommended object sample is a probability that the association feature is allocated to a $j^{th}$ feature interaction group in the $k^{th}$- order feature interaction set, and the $j^{th}$ feature interaction group is any feature interaction group in the $k^{th}$-order feature interaction set; and obtain the $k^{th}$-order feature interaction set of the candidate recommended object sample based on the allocation probability of each of the plurality of association features of the candidate recommended object sample.

In a possible embodiment, when obtaining the $k^{th}$-order feature interaction set of the candidate recommended object sample based on the allocation probability of each of the plurality of association features of the candidate recommended object sample, the automatic feature grouping unit 802 is further configured to:

determine an allocation value of the association feature based on the allocation probability of each of the plurality of association features of the candidate recommended object sample, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

It should be noted that the foregoing units (the obtaining unit 801, the automatic feature grouping unit 802, the calculation unit 803, and the adjustment unit 804) are configured to perform related content of the method shown in step S401 to step S405.

In this embodiment, the training device 800 is presented in a form of a unit. The "unit" herein may be an application-specific integrated circuit (application-specific integrated circuit, ASIC), a processor and a memory for executing one or more software or firmware programs, an integrated logic circuit, and/or another device that can provide the foregoing functions. In addition, the obtaining unit 801, the automatic feature grouping unit 802, the calculation unit 803, and the adjustment unit 804 in the training device 800 may be implemented by using a processor 1001 of a training device shown in FIG. 10.

Figure 9:
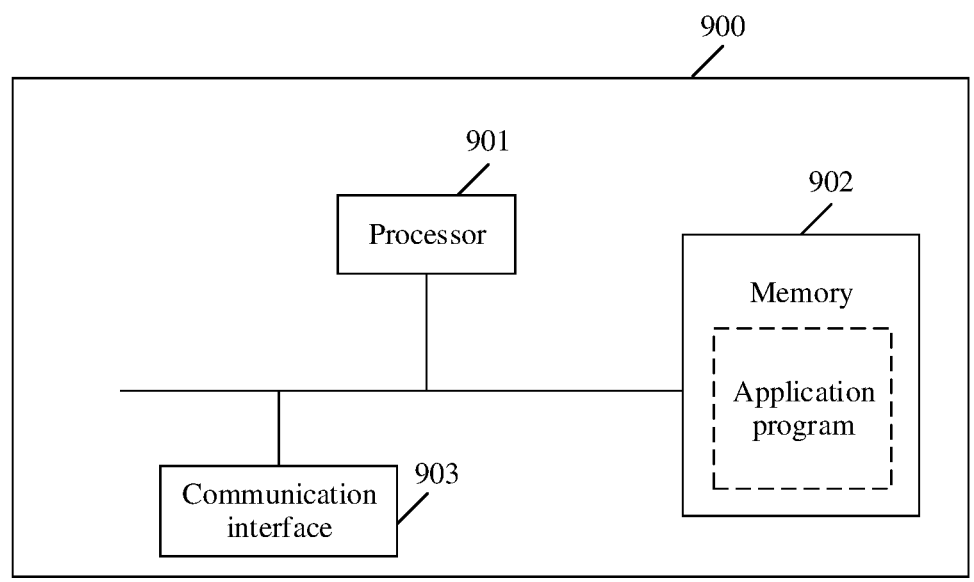
FIG. 9 is a schematic diagram of a structure of another recommendation apparatus according to an embodiment of this application.

A recommendation apparatus shown in FIG. 9 may be implemented by using a structure in FIG. 9. The recommendation apparatus includes at least one processor 901, at least one memory 902, and at least one communication interface 903. The processor 901, the memory 902, and the communication interface 903 are connected to and communicate with each other by using a communication bus.

The communication interface 903 is configured to communicate with another device or a communication network, for example, the Ethernet, a radio access network (RAN), or a wireless local area network (WLAN).

The memory 902 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited thereto. The memory may exist independently, and is connected to the processor through the bus. The memory may alternatively be integrated with the processor.

The memory 902 is configured to store application program code used to execute the foregoing solution, and the processor 901 controls the execution. The processor 901 is configured to execute the application program code stored in the memory 902.

The code stored in the memory 902 may be used to perform the recommendation method based on automatic feature grouping.

The processor 901 may alternatively be one or more integrated circuits, and is configured to execute a related program, to implement the recommendation method based on automatic feature grouping in embodiments of this application.

The processor 901 may alternatively be an integrated circuit chip and has a signal processing capability. In an implementation process, steps of the recommendation method in this application may be completed by using a hardware integrated logic circuit or an instruction in a form of software in the processor 901. In an implementation process, the steps of the recommendation method in this application may be completed by using a hardware integrated logic circuit or instructions in a form of software in the processor 901. Alternatively, the processor 901 may be a general-purpose processor, a digital signal processor (DSP), an ASIC, a field programmable gate array (FPGA) or another programmable logic device, a discrete gate or a transistor logic device, or a discrete hardware component. The processor 901 can implement or perform the methods, steps, and module block diagrams that are disclosed in the embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 902. The processor 901 reads information in the memory 902, and completes the recommendation method or the model training method in embodiments of this application in combination with hardware of the processor 901.

The communication interface 903 uses a transceiver apparatus, such as but not limited to a transceiver, to implement communication between a recommendation apparatus or a training apparatus and another device or a communication network. For example, the communication interface 903 may be configured to obtain recommendation-related data or training data, or send a recommended object to user equipment and receive feedback information of a user for the recommended object.

The bus may include a path for transmitting information between the components (for example, the memory 902, the processor 901, and the communication interface 903) of the apparatus. In a possible embodiment, the processor 901 is further configured to:

obtain a plurality of candidate recommended objects and a plurality of association features of each of the plurality of candidate recommended objects; perform multi-order automatic feature grouping on the plurality of association features of each of the plurality of candidate recommended objects, to obtain a multi-order feature interaction set of each candidate recommended object, where each-order feature interaction set in the multi-order feature interaction set of each of the plurality of candidate recommended objects includes one or more feature interaction groups, each of the one or more feature interaction groups includes at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0; obtain an interaction feature contribution value of each candidate recommended object through calculation based on the plurality of association features in the multi-order feature interaction set of each of the plurality of candidate recommended objects; obtain a prediction score of each candidate recommended object through calculation based on the interaction feature contribution value of each of the plurality of candidate recommended objects; and determine one or more corresponding candidate recommended objects with a high prediction score in the plurality of candidate recommended objects as a target recommended object.

In a possible embodiment, when obtaining the interaction feature contribution value of each candidate recommended object through calculation based on the plurality of association features in the multi-order feature interaction set of each of the plurality of candidate recommended objects, the processor 901 is further configured to:

for the multi-order feature interaction set of each candidate recommended object,
obtain a $k^{th}$-order interaction result of each feature interaction group through calculation based on a plurality of association features of each feature interaction group in the $k^{th}$-order feature interaction set; and obtain the interaction feature contribution value of the candidate recommended object through calculation based on a corresponding-order interaction result of a feature interaction group in the multi-order feature interaction set.

In a possible embodiment, when obtaining the $k^{th}$-order interaction result of the feature interaction group through calculation based on the plurality of association features of each feature interaction group in the $k^{th}$-order feature interaction set, the processor 901 is further configured to:

input the plurality of association features of each feature interaction group in the $k^{th}$-order feature interaction set to a feature interaction model for calculation, to obtain the $k^{th}$-order interaction result of each feature interaction group.

In a possible embodiment, when inputting the plurality of association features of each feature interaction group in the $k^{th}$-order feature interaction set to the feature interaction model for calculation, to obtain the $k^{th}$-order interaction result of each feature interaction group, the processor 901 is further configured to:

perform the following steps on each feature interaction group in the $k^{th}$-order feature interaction set:
obtaining a feature vector of each association feature of the feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of the candidate recommended object through calculation based on the corresponding-order interaction result of the feature interaction group in the multi-order feature interaction set of the candidate recommended object, the processor 901 is further configured to:

obtain an interaction feature vector based on the corresponding-order interaction result of the feature interaction group in the multi-order feature interaction set of the candidate recommended object; and input the interaction feature vector to a neural network model for calculation, to obtain the interaction feature contribution value of the candidate recommended object, where the neural network model is obtained based on a fully connected neural network.

In a possible embodiment, the processor 901 is further configured to:

input the plurality of association features of each of the plurality of candidate recommended objects to an automatic feature grouping model for processing, to obtain the multi-order feature interaction set of each candidate recommended object.

Specifically, when inputting the plurality of association features of each of the plurality of candidate recommended objects to the automatic feature grouping model for processing, to obtain the multi-order feature interaction set of each candidate recommended object, the processor 901 is further configured to:

for $k^{th}$-order feature interaction set of each candidate recommended object, obtain an allocation probability of each of the plurality of association features of each candidate recommended object, where the allocation probability of each of the plurality of association features of the candidate recommended object is a probability that the association feature is allocated to the $j^{th}$ feature interaction group in the $k^{th}$-order feature interaction set, and the $j^{th}$ feature interaction group is any feature interaction group in the $k^{th}$-order feature interaction set; and obtain the $k^{th}$-order feature interaction set of each candidate recommended object based on the allocation probability of each of the plurality of association features of the candidate recommended object.

Further, when obtaining the $k^{th}$-order feature interaction set of the candidate recommended object based on the allocation probability of each of the plurality of association features of the candidate recommended object, the processor 901 is further configured to:

determine an allocation value of the association feature based on the allocation probability of each of the plurality of association features of the candidate recommended object, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

Optionally, the non-linear mathematical operation may be a vector inner product operation, matrix multiplication, or another non-linear mathematical operation.

Figure 10:
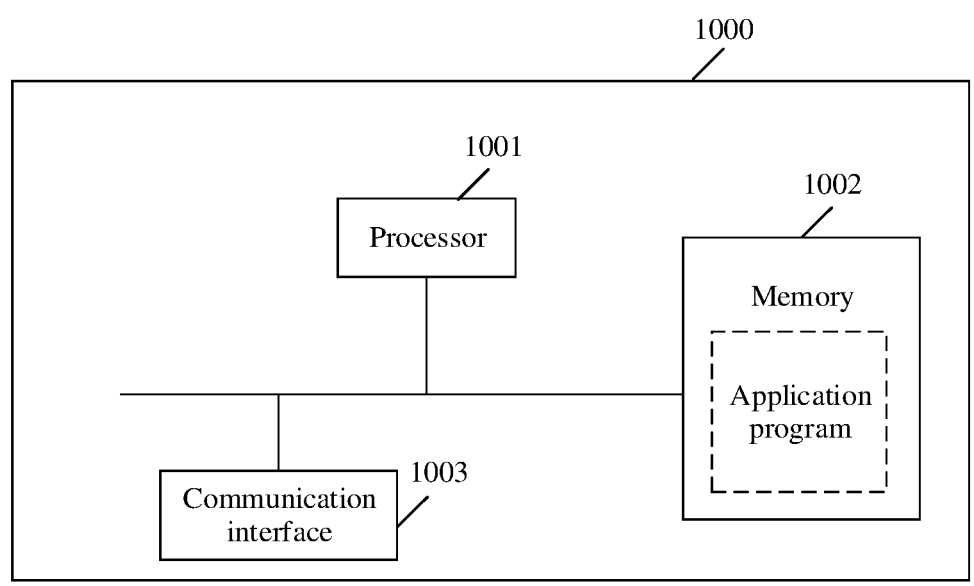
FIG. 10 is a schematic diagram of a structure of another training device based on a prediction model according to an embodiment of this application.

A training device shown in FIG. 10 may be implemented by using a structure in FIG. 10. The training device includes at least one processor 1001, at least one memory 1002, and at least one communication interface 1003. The processor 1001, the memory 1002, and the communication interface 1003 are connected to and communicate with each other by using a communication bus.

The communication interface 1003 is configured to communicate with another device or a communication network, for example, the Ethernet, a radio access network (RAN), or a wireless local area network (WLAN).

The memory 1002 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory is not limited thereto. The memory may exist independently, and is connected to the processor through the bus. The memory may alternatively be integrated with the processor.

The memory 1002 is configured to store application program code used to execute the foregoing solution, and the processor 1001 controls the execution. The processor 1001 is configured to execute the application program code stored in the memory 1002.

The code stored in the memory 1002 may be used to perform the training method based on a prediction model.

The processor 1001 may alternatively be one or more integrated circuits, and is configured to execute a related program, to implement the recommendation method based on automatic feature grouping in embodiments of this application.

The processor 1001 may alternatively be an integrated circuit chip and has a signal processing capability. In an implementation process, steps of the recommendation method in this application may be completed by using a hardware integrated logic circuit or an instruction in a form of software in the processor 1001. In an implementation process, the steps of the recommendation method in this application may be completed by using a hardware integrated logic circuit or instructions in a form of software in the processor 1001. Alternatively, the processor 1001 may be a general-purpose processor, a digital signal processor (DSP), an ASIC, a field programmable gate array (FPGA) or another programmable logic device, a discrete gate or a transistor logic device, or a discrete hardware component. The processor 1001 can implement or perform the methods, steps, and module block diagrams that are disclosed in the embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory 1002. The processor 1001 reads information in the memory 1002, and completes the recommendation method or the model training method in embodiments of this application in combination with hardware of the processor 1001.

The communication interface 1003 uses a transceiver apparatus, such as but not limited to a transceiver, to implement communication between a recommendation apparatus or a training apparatus and another device or a communication network. For example, the communication interface 1003 may be configured to obtain recommendation-related data or training data, or send a recommended object to user equipment and receive feedback information of a user for the recommended object.

The bus may include a path for transmitting information between the components (for example, the memory 1002, the processor 1001, and the communication interface 1003) of the apparatus. In a possible embodiment, the processor 1001 is further configured to:

obtain training sample data, where the training sample data includes a plurality of candidate recommended object samples and a recommended object sample clicked by a user; obtain a plurality of association features of each of the plurality of candidate recommended object samples; input the plurality of association features of each of the plurality of candidate recommended object samples to a multi-order automatic feature grouping model for automatic feature grouping, to obtain a multi-order feature interaction set of each candidate recommended object sample, where each-order feature interaction set in the multi-order feature interaction set of each of the plurality of candidate recommended object samples includes one or more feature interaction groups, each of the one or more feature interaction groups includes at least one of the plurality of association features of the candidate recommended object sample, in each feature interaction group in a $k^{th}$-order feature interaction set in the multi-order feature interaction set, a quantity of association features used in a non-linear mathematical operation is k, and k is an integer greater than 0; input the multi-order feature interaction set of each of the plurality of candidate recommended object samples to a feature interaction model for calculation, to obtain an interaction feature contribution value of each candidate recommended object sample; obtain a prediction score of each candidate recommended object sample through calculation based on the interaction feature contribution value of each of the plurality of candidate recommended object samples; and adjust a parameter of the automatic feature grouping model and a parameter of the feature interaction model based on a candidate recommended object sample corresponding to a maximum prediction score and an object sample clicked by the user, to obtain an adjusted automatic feature grouping model and an adjusted feature interaction model.

Optionally, the non-linear mathematical operation may be a vector inner product operation, matrix multiplication, or another non-linear mathematical operation.

In a possible embodiment, when inputting the multi-order feature interaction set of each of the plurality of candidate recommended object samples to the feature interaction model for calculation, to obtain the interaction feature contribution value of each candidate recommended object sample, the processor 1001 is further configured to:

for the multi-order feature interaction set of each candidate recommended object sample, obtain a $k^{th}$-order interaction result of the feature interaction group through calculation based on association features of each feature interaction group in the $k^{th}$-order feature interaction set, where the $k^{th}$-order feature interaction set is any-order feature interaction set in the multi-order feature interaction set of the candidate recommended object sample; and obtain the interaction feature contribution value of the candidate recommended object sample through calculation based on a corresponding-order interaction result of a feature interaction group in the multi-order feature interaction set of the candidate recommended object sample.

In a possible embodiment, when obtaining the $k^{th}$-order interaction result of the feature interaction group through calculation based on the association features of each feature interaction group in the $k^{th}$-order feature interaction set, the processor 1001 is further configured to:

perform the following steps on each feature interaction group in the $k^{th}$-order feature interaction set:

obtaining a feature vector of each association feature of each feature interaction group and a weight corresponding to the feature vector; performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

In a possible embodiment, when obtaining the interaction feature contribution value of the candidate recommended object sample through calculation based on the corresponding-order interaction result of the feature interaction group in the multi-order feature interaction set of the candidate recommended object sample, the processor 1001 is further configured to:

obtain an interaction feature vector based on the corresponding-order interaction result of the feature interaction group in the multi-order feature interaction set of the candidate recommended object sample; and input the interaction feature vector to a neural network model for calculation, to obtain the interaction feature contribution value of the candidate recommended object sample, where the neural network model is obtained based on a fully connected neural network.

In a possible embodiment, when adjusting the parameter of the automatic feature grouping model and the parameter of the feature interaction model based on the candidate recommended object sample corresponding to the maximum prediction score and the object sample clicked by the user, to obtain the adjusted automatic feature grouping model and the adjusted feature interaction model, the processor 1001 is further configured to:

adjust the parameter of the automatic feature grouping model, the parameter of the feature interaction model, and a parameter of the neural network model based on the candidate recommended object sample corresponding to the maximum prediction score and the object sample clicked by the user, to obtain an adjusted automatic feature grouping model, an adjusted feature interaction model, and an adjusted neural network model.

Optionally, when inputting the plurality of association features of each of the plurality of candidate recommended object samples to the multi-order automatic feature grouping model for automatic feature grouping, to obtain the multi-order feature interaction set of each candidate recommended object sample, the processor 1001 is further configured to:

for $k^{th}$-order feature interaction set of each candidate recommended object sample, obtain an allocation probability of each of the plurality of association features of the candidate recommended object sample, where the allocation probability of each of the plurality of association features of the candidate recommended object sample is a probability that the association feature is allocated to a $j^{th}$ feature interaction group in the $k^{th}$-order feature interaction set, and the $j^{th}$ feature interaction group is any feature interaction group in the $k^{th}$-order feature interaction set; and obtain the $k^{th}$-order feature interaction set of the candidate recommended object sample based on the allocation probability of each of the plurality of association features of the candidate recommended object sample.

In a possible embodiment, when obtaining the $k^{th}$-order feature interaction set of the candidate recommended object sample based on the allocation probability of each of the plurality of association features of the candidate recommended object sample, the processor 1001 is further configured to:

determine an allocation value of the association feature based on the allocation probability of each of the plurality of association features of the candidate recommended object sample, where the allocation value is a probability that each association feature is allocated to the $j^{th}$ feature interaction group in the $k^{th}$-order feature interaction set; and if the allocation value of the association feature is greater than a preset threshold, allocate the association feature to the $j^{th}$ feature interaction group in the $k^{th}$-order feature interaction set, or if the allocation value of the association feature is not greater than a preset threshold, skip allocating the association feature to the $j^{th}$ feature interaction group in the $k^{th}$-order feature interaction set.

An embodiment of this application provides a computer storage medium. The computer storage medium stores a computer program, the computer program includes program instructions, and when the program instructions are executed by a processor, the processor performs some or all steps of any recommendation method or training method based on a prediction model in the method embodiments.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should further be appreciated by a person skilled in the art that embodiments described in this specification all belong to optional embodiments, and the related actions and modules are not necessarily required by this application.

In the foregoing embodiments, descriptions of each embodiment have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, in other words, may be located in one position, or may be distributed on a plurality of network units. Some or all of the units may be selected based on actual requirements to achieve objectives of the solutions of the embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The software product is stored in a storage medium and includes several instructions for instructing a computer device (which may be a personal computer, a server, or a network device) to perform all or some of the steps of the methods described in embodiments of this application. The foregoing memory includes any medium that can store program code, such as a USB flash drive, a ROM, a RAM, a removable hard disk, a magnetic disk, or an optical disc.

A person of ordinary skill in the art may understand that all or some of the steps of the methods in the embodiments may be implemented by a program instructing related hardware. The program may be stored in a computer readable memory. The memory may include: a flash memory, a ROM, a RAM, a magnetic disk, or an optical disc.

The foregoing describes in detail embodiments of this application. The principle and implementations of this application are described herein through specific examples. The descriptions about embodiments of this application are merely provided to help understand the method and core ideas of this application. In addition, persons of ordinary skill in the art can make variations and modifications to this application in terms of the specific implementations and application scopes according to the ideas of this application. Therefore, the content of specification shall not be construed as a limit to this application.

What is claimed is:

1. A recommendation method based on automatic feature grouping, comprising:

obtaining a plurality of candidate recommended objects and a plurality of association features of each of the plurality of candidate recommended objects;

performing multi-order automatic feature grouping on the plurality of association features of each of the plurality of candidate recommended objects, to obtain a multi-order feature interaction set of each candidate recommended object, wherein each-order feature interaction set in the multi-order feature interaction set of each of the plurality of candidate recommended objects comprises one or more feature interaction groups, each of the one or more feature interaction groups comprises at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0;

obtaining an interaction feature contribution value of each candidate recommended object through calculation based on the plurality of association features in the multi-order feature interaction set of each of the plurality of candidate recommended objects;

obtaining a prediction score of each candidate recommended object through calculation based on the interaction feature contribution value of each of the plurality of candidate recommended objects; and determining one or more corresponding candidate recommended objects as one or more target recommended objects, each of the one or more corresponding candidate recommended objects having a prediction score higher than at least some of the other candidate recommended objects in the plurality of candidate recommended objects, wherein the obtaining an interaction feature contribution value of each candidate recommended object through calculation based on the plurality of association features in the multi-order feature interaction set of each of the plurality of candidate recommended objects comprises:

for the multi-order feature interaction set of each candidate recommended object, obtaining a $k^{th}$-order interaction result of each feature interaction group through calculation based on a plurality of association features of each feature interaction group in the $k^{th}$-order feature interaction set, and obtaining the interaction feature contribution value of the candidate recommended object through calculation based on a corresponding-order interaction result of a feature interaction group in the multi-order feature interaction set of the candidate recommended object, wherein the obtaining the interaction feature contribution value of the candidate recommended object through calculation based on a corresponding-order interaction result of a feature interaction group in the multi-order feature interaction set of the candidate recommended object comprises:

obtaining an interaction feature vector based on the corresponding-order interaction result of the feature interaction group in the multi-order feature interaction set of the candidate recommended object; and inputting the interaction feature vector to a neural network model for calculation, to obtain the interaction feature contribution value of the candidate recommended object, wherein the neural network model is obtained based on a fully connected neural network.

2. The method according to claim 1, wherein the obtaining a $k^{th}$-order interaction result of each feature interaction group through calculation based on a plurality of association features of each feature interaction group in the $k^{th}$-order feature interaction set comprises:

inputting the plurality of association features of each feature interaction group in the $k^{th}$-order feature interaction set to a feature interaction model for calculation, to obtain the $k^{th}$-order interaction result of each feature interaction group.

3. The method according to claim 2, wherein the inputting the plurality of association features of each feature interaction group in the $k^{th}$-order feature interaction set to a feature interaction model for calculation, to obtain the $k^{th}$-order interaction result of the feature interaction group comprises:

performing, on each feature interaction group in the $k^{th}$-order feature interaction set, operations comprising:

obtaining a feature vector of each association feature of the interaction group and a weight corresponding to the feature vector;

performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

4. The method according to claim 1, wherein the performing multi-order automatic feature grouping on the plurality of association features of each of the plurality of candidate recommended objects, to obtain a multi-order feature interaction set of each candidate recommended object comprises:

inputting the plurality of association features of each of the plurality of candidate recommended objects to an automatic feature grouping model for processing, to obtain the multi-order feature interaction set of each candidate recommended object.

5. The method according to claim 4, wherein the inputting the plurality of association features of each of the plurality of candidate recommended objects to an automatic feature grouping model for processing, to obtain the multi-order feature interaction set of each candidate recommended object comprises:

for $k^{th}$-order feature interaction set of each candidate recommended object, obtaining an allocation probability of each of the plurality of association features of the candidate recommended object, and obtaining the $k^{th}$-order feature interaction set of the candidate recommended object based on the allocation probability of each of the plurality of association features of the candidate recommended object, wherein the allocation probability of each of the plurality of association features of the candidate recommended object is a probability that each association feature is allocated to a $j^{th}$ feature interaction group in the $k^{th}$-order feature interaction set, and the $j^{th}$ feature interaction group is any feature interaction group in the $k^{th}$-order feature interaction set.

6. The method according to claim 5, wherein the obtaining the $k^{th}$-order feature interaction set of the candidate recommended object based on the allocation probability of each of the plurality of association features of the candidate recommended object comprises:

determining an allocation value of the association feature based on the allocation probability of each of the plurality of association features of the candidate recommended object, wherein the allocation value is a probability that each association feature is allocated to the $j^{th}$ feature interaction group in the $k^{th}$-order feature interaction set; and when the allocation value of the association feature is greater than a threshold, allocating the association feature to the $j^{th}$ feature interaction group in the $k^{th}$-order feature interaction set, or when the allocation value of the association feature is not greater than a threshold, skipping allocating the association feature to the $j^{th}$ feature interaction group in the $k^{th}$-order feature interaction set.

7. A recommendation apparatus, comprising:

a memory, configured to store instructions; and at least one processor, coupled to the memory, wherein when executing the instructions, the at least one processor performs operations comprising:

obtaining a plurality of candidate recommended objects and a plurality of association features of each of the plurality of candidate recommended objects;

performing multi-order automatic feature grouping on the plurality of association features of each of the plurality of candidate recommended objects, to obtain a multi-order feature interaction set of each candidate recommended object, wherein each-order feature interaction set in the multi-order feature interaction set of each of the plurality of candidate recommended objects comprises one or more feature interaction groups, each of the one or more feature interaction groups comprises at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0;

obtaining an interaction feature contribution value of each candidate recommended object through calculation based on the plurality of association features in the multi-order feature interaction set of each of the plurality of candidate recommended objects;

obtaining a prediction score of each candidate recommended object through calculation based on the interaction feature contribution value of each of the plurality of candidate recommended objects; and determining one or more corresponding candidate recommended objects as one or more target recommended objects, each of the one or more corresponding candidate recommended objects having a prediction score higher than at least some of the other candidate recommended objects in the plurality of candidate recommended objects, wherein the obtaining an interaction feature contribution value of each candidate recommended object through calculation based on the plurality of association features in the multi-order feature interaction set of each of the plurality of candidate recommended objects comprises:

for the multi-order feature interaction set of each candidate recommended object, obtaining a $k^{th}$-order interaction result of each feature interaction group through calculation based on a plurality of association features of each feature interaction group in the $k^{th}$-order feature interaction set, and obtaining the interaction feature contribution value of the candidate recommended object through calculation based on a corresponding-order interaction result of a feature interaction group in the multi-order feature interaction set of the candidate recommended object, wherein the obtaining the interaction feature contribution value of the candidate recommended object through calculation based on a corresponding-order interaction result of a feature interaction group in the multi-order feature interaction set of the candidate recommended object comprises:
  obtaining an interaction feature vector based on the corresponding-order interaction result of the feature interaction group in the multi-order feature interaction set of the candidate recommended object; and
  inputting the interaction feature vector to a neural network model for calculation, to obtain the interaction feature contribution value of the candidate recommended object, wherein the neural network model is obtained based on a fully connected neural network.

8. The apparatus according to claim 7, wherein the obtaining a $k^{th}$-order interaction result of each feature interaction group through calculation based on a plurality of association features of each feature interaction group in the $k^{th}$-order feature interaction set comprises:
  inputting the plurality of association features of each feature interaction group in the $k^{th}$-order feature interaction set to a feature interaction model for calculation, to obtain the $k^{th}$-order interaction result of each feature interaction group.

9. The apparatus according to claim 8, wherein the inputting the plurality of association features of each feature interaction group in the $k^{th}$-order feature interaction set to a feature interaction model for calculation, to obtain the $k^{th}$-order interaction result of the feature interaction group comprises:
  performing, on each feature interaction group in the $k^{th}$-order feature interaction set, operations comprising:
  obtaining a feature vector of each association feature of the interaction group and a weight corresponding to the feature vector;
  performing weighted summation on the feature vector of each association feature of the feature interaction group and the weight corresponding to the feature vector, to obtain a feature value of the feature interaction group; and
  determining the $k^{th}$-order interaction result of the feature interaction group based on the feature vector of each association feature of the feature interaction group, the weight corresponding to the feature vector, and the feature value of the feature interaction group.

10. The apparatus according to claim 7, wherein the performing multi-order automatic feature grouping on the plurality of association features of each of the plurality of candidate recommended objects, to obtain a multi-order feature interaction set of each candidate recommended object comprises:
  inputting the plurality of association features of each of the plurality of candidate recommended objects to an automatic feature grouping model for processing, to obtain the multi-order feature interaction set of each candidate recommended object.

11. The apparatus according to claim 10, wherein the inputting the plurality of association features of each of the plurality of candidate recommended objects to an automatic feature grouping model for processing, to obtain the multi-order feature interaction set of each candidate recommended object comprises:
  for $k^{th}$-order feature interaction set of each candidate recommended object, obtaining an allocation probability of each of the plurality of association features of the candidate recommended object, and
  obtaining the $k^{th}$-order feature interaction set of the candidate recommended object based on the allocation probability of each of the plurality of association features of the candidate recommended object,
  wherein the allocation probability of each of the plurality of association features of the candidate recommended object is a probability that each association feature is allocated to a $j^{th}$ feature interaction group in the $k^{th}$-order feature interaction set, and the $j^{th}$ feature interaction group is any feature interaction group in the $k^{th}$-order feature interaction set.

12. The apparatus according to claim 11, wherein the obtaining the $k^{th}$-order feature interaction set of the candidate recommended object based on the allocation probability of each of the plurality of association features of the candidate recommended object comprises:
  determining an allocation value of the association feature based on the allocation probability of each of the plurality of association features of the candidate recommended object, wherein the allocation value is a probability that each association feature is allocated to the $j^{th}$ feature interaction group in the $k^{th}$-order feature interaction set; and
  when the allocation value of the association feature is greater than a threshold, allocating the association feature to the $j^{th}$ feature interaction group in the $k^{th}$-order feature interaction set, or
  when the allocation value of the association feature is not greater than a threshold, skipping allocating the association feature to the $j^{th}$ feature interaction group in the $k^{th}$-order feature interaction set.

13. A chip system, wherein the chip system is applied to an electronic device, the chip system comprises one or more interface circuits and one or more processors, the one or more interface circuits and the one or more processors are interconnected by using one or more lines, the one or more interface circuits are configured to receive one or more signals from a memory of the electronic device, and send the one or more signals to the one or more processors, the one or more signals comprise computer instructions stored in the memory, and when the one or more processors execute the computer instructions, the electronic device performs operations comprising:
  obtaining a plurality of candidate recommended objects and a plurality of association features of each of the plurality of candidate recommended objects;
  performing multi-order automatic feature grouping on the plurality of association features of each of the plurality of candidate recommended objects, to obtain a multi-order feature interaction set of each candidate recommended object, wherein each-order feature interaction set in the multi-order feature interaction set of each of the plurality of candidate recommended objects comprises one or more feature interaction groups, each of the one or more feature interaction groups comprises at least one of the plurality of association features of the candidate recommended object, in each feature interaction group in a $k^{th}$-order feature interaction set in the multi-order feature interaction set, a quantity of association features used in a non-linear mathematical operation is k, and k is an integer greater than 0;
  obtaining an interaction feature contribution value of each candidate recommended object through calculation based on the plurality of association features in the multi-order feature interaction set of each of the plurality of candidate recommended objects;

obtaining a prediction score of each candidate recommended object through calculation based on the interaction feature contribution value of each of the plurality of candidate recommended objects; and determining one or more corresponding candidate recommended objects as one or more target recommended objects, each of the one or more corresponding candidate recommended objects having a prediction score higher than at least some of the other candidate recommended objects in the plurality of candidate recommended objects, wherein the obtaining an interaction feature contribution value of each candidate recommended object through calculation based on the plurality of association features in the multi-order feature interaction set of each of the plurality of candidate recommended objects comprises:

for the multi-order feature interaction set of each candidate recommended object, obtaining a $k^{th}$-order interaction result of each feature interaction group through calculation based on a plurality of association features of each feature interaction group in the $k^{th}$-order feature interaction set, and obtaining the interaction feature contribution value of the candidate recommended object through calculation based on a corresponding-order interaction result of a feature interaction group in the multi-order feature interaction set of the candidate recommended object, wherein the obtaining the interaction feature contribution value of the candidate recommended object through calculation based on a corresponding-order interaction result of a feature interaction group in the multi-order feature interaction set of the candidate recommended object comprises:

obtaining an interaction feature vector based on the corresponding-order interaction result of the feature interaction group in the multi-order feature interaction set of the candidate recommended object; and inputting the interaction feature vector to a neural network model for calculation, to obtain the interaction feature contribution value of the candidate recommended object, wherein the neural network model is obtained based on a fully connected neural network.

14. The chip system according to claim 13, wherein the obtaining a $k^{th}$-order interaction result of each feature interaction group through calculation based on a plurality of association features of each feature interaction group in the $k^{th}$-order feature interaction set comprises:

inputting the plurality of association features of each feature interaction group in the $k^{th}$-order feature interaction set to a feature interaction model for calculation, to obtain the $k^{th}$-order interaction result of each feature interaction group.

15. The chip system according to claim 14, wherein the inputting the plurality of association features of each feature interaction group in the $k^{th}$-order feature interaction set to a feature interaction model for calculation, to obtain the $k^{th}$-order interaction result of the feature interaction group comprises:

performing, on each feature interaction group in the $k^{th}$-order feature interaction set, operations comprising:

obtaining a feature vector of each association feature of the interaction group and a weight corresponding to the feature vector;

performing weighted summation on the feature vector of each association feature of the feature interaction group and the weight corresponding to the feature vector, to obtain a feature value of the feature interaction group; and determining the $k^{th}$-order interaction result of the feature interaction group based on the feature vector of each association feature of the feature interaction group, the weight corresponding to the feature vector, and the feature value of the feature interaction group.

* * * * *

UNITED STATES PATENT AND TRADEMARK OFFICE
CERTIFICATE OF CORRECTION

PATENT NO. : 12,443,677 B2
APPLICATION NO. : 17/964117
DATED : October 14, 2025
INVENTOR(S) : Bin Liu et al.

Page 1 of 1

It is certified that error appears in the above-identified patent and that said Letters Patent is hereby corrected as shown below:

In the Specification

Column 29, Line 56:

Change "$I_0^1 = 0,7 + e_{1,12}$" to -- $I_0^1 = e_{0,7} + e_{1,12}$ --; and

Column 29, Line 58:

Change "$13 = (e_{0,7} + e_{1,12} + e_{2,35})^2 - (e_{0,7})_2 - (e_{1,12})^2 - (e_{2,35})^2$" to -- $I_0^2 = (e_{0,7} + e_{1,12} + e_{2,35})^2 - (e_{0,7})^2 - (e_{1,12})^2 - (e_{2,35})^2$ --.

Signed and Sealed this
Eleventh Day of November, 2025

John A. Squires
*Director of the United States Patent and Trademark Office*